(12) United States Patent
Oyama et al.

(10) Patent No.: US 7,999,873 B2
(45) Date of Patent: Aug. 16, 2011

(54) IMAGING DEVICE WITH PLURAL LENSES AND IMAGING REGIONS

(75) Inventors: Ichiro Oyama, Osaka (JP); Taku Hirasawa, Kyoto (JP); Michiyoshi Nagashima, Nara (JP); Tomokuni Iijima, Osaka (JP)

(73) Assignee: Panasonic Corporation, Osaka (JP)

(*) Notice: Subject to any disclaimer, the term of this patent is extended or adjusted under 35 U.S.C. 154(b) by 533 days.

(21) Appl. No.: 12/094,051

(22) PCT Filed: Nov. 10, 2006

(86) PCT No.: PCT/JP2006/322475
§ 371 (c)(1),
(2), (4) Date: May 16, 2008

(87) PCT Pub. No.: WO2007/060847
PCT Pub. Date: May 31, 2007

(65) Prior Publication Data
US 2009/0160997 A1    Jun. 25, 2009

(30) Foreign Application Priority Data
Nov. 22, 2005    (JP) .................................. 2005-336542

(51) Int. Cl.
*H04N 5/225* (2006.01)
(52) U.S. Cl. ........................................................ 348/340
(58) Field of Classification Search .................... 348/340
See application file for complete search history.

(56) References Cited

U.S. PATENT DOCUMENTS

| | | | |
|---|---|---|---|
| 6,720,997 B1* | 4/2004 | Horie et al. | 348/218.1 |
| 6,882,368 B1 | 4/2005 | Suda | |
| 7,199,348 B2* | 4/2007 | Olsen et al. | 250/208.1 |
| 7,566,855 B2* | 7/2009 | Olsen et al. | 250/208.1 |
| 7,714,262 B2* | 5/2010 | Olsen et al. | 250/208.1 |
| 7,772,532 B2* | 8/2010 | Olsen et al. | 250/208.1 |
| 2002/0089596 A1 | 7/2002 | Suda | |
| 2002/0122124 A1 | 9/2002 | Suda | |
| 2003/0071905 A1* | 4/2003 | Yamasaki | 348/239 |
| 2007/0002159 A1* | 1/2007 | Olsen et al. | 348/335 |

FOREIGN PATENT DOCUMENTS

| | | |
|---|---|---|
| JP | 8-149381 | 6/1996 |
| JP | 10-304235 | 11/1998 |
| JP | 2001-78212 | 3/2001 |
| JP | 2002-204462 | 7/2002 |
| JP | 2002-262300 | 9/2002 |
| JP | 2005-176040 | 6/2005 |
| JP | 2005-303694 | 10/2005 |

* cited by examiner

*Primary Examiner* — David Ometz
*Assistant Examiner* — Antoinette Spinks
(74) *Attorney, Agent, or Firm* — Hamre, Schumann, Mueller & Larson, P.C.

(57) ABSTRACT

A plurality of lenses 102a to 102d arranged in the same plane form a plurality of subject images on a plurality of imaging regions 104a to 104d. Vertical line directions and horizontal line directions of the pixel arrangement in the respective plurality of imaging regions are equal to one another among the plurality of imaging regions. Further, at least one pair of subject images received by at least one pair of imaging regions having a parallax in the vertical line (or horizontal line) direction among the plurality of imaging regions are shifted from each other by a predetermined amount in the horizontal line (or vertical line) direction. By performing pixel shifting in a direction perpendicular to the direction in which a parallax is generated, it always is possible to obtain a high-resolution image even when the subject distance varies.

17 Claims, 20 Drawing Sheets

-- Prior Art --

-- Prior Art --

-- Prior Art --

-- Prior Art --

IMAGING DEVICE WITH PLURAL LENSES AND IMAGING REGIONS

TECHNICAL FIELD

The present invention relates to a compound-eye imaging device that captures an image with a plurality of optical systems, for use in applications such as mobile equipment, a vehicle, a medical application, a monitoring application, and a robot.

BACKGROUND ART

In recent years, it has been strongly required for imaging devices to have a small size in addition to a larger number of pixels. In many cases, the reduction in size is obstructed by the size and focal length of an optical lens and the size of an imaging device.

In general, when the wavelength of light varies, the refractive index of a material varies, and accordingly the focal length also varies. Thus, it is impossible to form a subject image including information of light of all wavelengths on an imaging plane using a single lens. Therefore, in an optical system of usual imaging devices, a plurality of optical lenses are arranged along an optical axis direction so that images of red wavelength light, green wavelength light, and blue wavelength light are formed on the same imaging plane. This makes the optical length longer, resulting in a thicker imaging device.

Therefore, as a technique effective for a reduction in size of imaging devices, particularly for a reduction in thickness, a compound-eye imaging device has been proposed in which a plurality of single lenses having a short focal length are arranged substantially in the same plane (see, Patent Document 1, for example). In a compound-eye color imaging device, a lens for forming an image of blue wavelength light, a lens for forming an image of green wavelength light, and a lens for forming an image of red wavelength light are arranged in the same plane, and imaging planes of imaging devices are arranged on optical axes of the respective lenses. Since the wavelength region of light handled by each lens is limited narrowly, it becomes possible to form a plurality of subject images on the plurality of imaging planes arranged in the same plane using the plurality of single lenses by making the focal lengths of the respective lenses equal. Therefore, the thickness of the imaging device can be reduced considerably.

FIG. 16 is a perspective view showing an exemplary compound-eye imaging device. Numeral 500 denotes a lens array including four lenses 501a, 501b, 501c, and 501d that are formed integrally. The lens 501a is for forming an image of red wavelength light, and forms a subject image on an imaging region 502a of an imaging device where a red wavelength separation filter (color filter) is attached to an imaging plane. The lenses 501b and 501d are for forming an image of green wavelength light, and form subject images on imaging regions 502b and 502d of imaging devices where a green wavelength separation filter (color filter) is attached to imaging planes. The lens 501c is for forming an image of blue wavelength light, and forms a subject image on an imaging region 502c of an imaging device where a blue wavelength separation filter (color filter) is attached to an imaging plane. The imaging devices convert the light intensity of the subject images formed on the respective imaging regions 502a to 502d into image data for output. These image data are superposed and synthesized, thereby obtaining a color image. It should be noted that the number of the lenses is not limited to four.

Although a compound-eye imaging device can achieve a reduced thickness as described above, it has a problem of a poorer resolution compared with a usual single-eye imaging device including color filters in a Bayer arrangement. The following is a description of the reason for this.

The single-eye imaging device is provided with color filters in a Bayer arrangement on incident planes of a large number of pixels so that each of the pixels in an imaging device can take out predetermined color information. In other words, the color filters transmitting green light are arranged in a checkered pattern so as to correspond to the arrangement of the large number of pixels arranged in a matrix, and the color filters transmitting red light and those transmitting blue light are arranged alternately in the rest of the pixels. The arrangement of the color filters in this manner generally is called a Bayer arrangement. Each of the pixels in the imaging device only outputs color information of the wavelength region of light that is transmitted by the color filter, and does not output color information of the wavelength region of light that is not transmitted thereby. However, since pieces of image information of three colors are known to be correlated in a local region of an image (e.g., Non-Patent Document 1), the green image information can be estimated from the red or blue image information, for example. Utilizing such characteristics, the image information of a missing color is interpolated. Accordingly, it is possible to obtain a color image having a resolution corresponding to pixels as numerous as the number of effective pixels in the imaging device. For example, in the case of using an imaging device with 1,000,000 effective pixels, 500,000 pixels detect green image information, 250,000 pixels detect blue image information, and 250,000 pixels detect red image information. However, by the above-described interpolation, it is possible to obtain image information having a resolution corresponding to 1,000,000 pixels for each of red, green and blue.

On the other hand, in the compound-eye imaging device, since each of the imaging regions of the imaging devices corresponding to the respective colors acquires any of red, green, and blue image information, a color image having a resolution corresponding to pixels as numerous as the pixels in that imaging region is achieved. For example, in order for each of the imaging regions corresponding to red, green, and blue to have 250,000 pixels, the imaging device needs to have 1,000,000 pixels in total, but the resolution of a color image obtained by superposition corresponds to 250,000 pixels.

As a method for improving the image resolution, there is a technology called "pixel shifting" in which a plurality of images whose relative positional relationships between a subject image and pixels in an imaging device are shifted from each other are acquired by shifting relative positions of a lens and a subject in time series using an actuator, and then synthesized so as to achieve a high-resolution image (e.g., Patent Document 2). In the pixel shifting technology, the optimal amount of shifting is determined by the direction of shifting and the number of images to be acquired. For example, in the case of synthesizing two images, when the relative positional relationship between the subject image and the pixels is shifted by one-half the arrangement pitch of the pixels (in the following, referred to as the "pixel pitch") between the two images, it is possible to obtain the highest resolution image. The pixel shifting technology is applicable as long as it is possible to acquire a plurality of images whose relative positional relationships between the subject image formed by the lens and the pixels in the imaging device are shifted from each other, and can be applied also to the compound-eye imaging device. However, although the pixel shifting technology in which the relative positions of the lens and the subject are shifted in time series is effective for a static subject image, in the case of a non-static subject image, it is difficult to obtain a high-resolution image since the time series shifting of the relative positions of the lens and the subject delays the timing for capturing an image.

Further, Patent Document 3, for example, proposes a method for obtaining a high-resolution synthesized image in a compound-eye imaging device using a plurality of lenses to form a plurality of subject images on a plurality of imaging regions by positioning optical axes of the plurality of lenses with respect to pixels in an imaging device so that the pixel shifting is achieved such that the images of a subject at a predetermined distance are formed so as to be shifted by a predetermined amount in a direction connecting the optical axes of the lenses. Even in the case of a non-static subject image, this method can achieve a high-resolution image as long as the distance between the subject and the imaging device is fixed.

Patent Document 1: JP 2002-204462 A
Patent Document 2: JP 10 (1998)-304235 A
Patent Document 3: JP 2002-209226 A
Non-Patent Document 1: Hiroaki KOTERA and two others, "Representation of Full Color Image from a Single Color Image Using Color Correlation" Proceedings of 1988 Annual Conference of The Institute of Image Electronics Engineers of Japan 20, pp. 83-86 (1988)

DISCLOSURE OF INVENTION

Problem to be Solved by the Invention

However, the method described in Patent Document 3 has two problems.

The first problem is that in the case where the distance between the subject and the imaging device is not a predetermined value, or where the distance between the optical axes of the plurality of lenses varies due to a temperature variation or the like, the amount of pixel shifting varies, which makes it impossible to obtain a high-resolution image. The following is a detailed description of this first problem.

In order to ensure that a high-resolution image is obtained by the pixel shifting technology, the relative positional relationship between the subject image and the pixels always has to be shifted between a plurality of images to be synthesized. FIGS. 17A and 17B are views showing the positional relationship between a subject, two lenses with different optical axes, and two subject images formed by the two lenses in a compound-eye imaging device. FIG. 17A is a cross-sectional view in a plane including the optical axes of the two lenses, and FIG. 17B is a plan view of an imaging plane of an imaging device viewed along a direction parallel with the optical axes. Numerals 600*a* and 600*b* denote the optical axes of lenses 601*a* and 601*b*, and numerals 602*a* and 602*b* denote positions at which the optical axes 600*a* and 600*b* cross an imaging region 603 of the imaging device. Numerals 605*a* and 605*b* denote subject images, formed by the lenses 601*a* and 601*b*, of a subject 604 located on the optical axis 600*a*. In the compound-eye imaging device, since the optical axes of the plurality of lenses are different from each other, the position of the subject image 605*b* on the imaging region 603 moves in a direction connecting the optical axes 600*a* and 600*b* of the lenses (a direction of an alternate long and short dashed line 610 in the figure) depending on the distance from the imaging device to the subject. This phenomenon is called "parallax." When A indicates the distance from the lens 601*a* to the subject 604 (in the following, referred to as the "subject distance"), d indicates the distance between the optical axes 600*a* and 600*b* of the lenses 601*a* and 601*b*, and V indicates the distance from the lenses 601*a* and 601*b* to the imaging region 603, a shifting amount S from the position 602*b* at which the optical axis 600*b* of the lens crosses the imaging region 603 to the subject image 605*b* is expressed by (Formula 1).

$$S = \frac{f \times d}{A} \qquad \text{[Formula 1]}$$

In this way, the relative positional relationship between the subject image 605*b* and the pixels in the imaging region 603 in the direction of the alternate long and short dashed line 610 connecting the optical axes 600*a* and 600*b* of the lenses varies according to the subject distance A. Thus, as in Patent Document 3, when the shifting amount of the subject image in the direction connecting the optical axes of the two lenses is set to a predetermined value in advance, the shifting amount S varies according to the distance A from the lens to the subject, and accordingly it is not always possible to obtain a high-resolution synthesized image depending on the subject distance. Also, when the distance d between the optical axes of the lenses varies due to a temperature variation, the shifting amount S varies similarly, and accordingly it is not always possible to obtain a high-resolution synthesized image.

The second problem is that even when the optical system is set so as to achieve a predetermined amount of pixel shifting, the shifting amount of the subject image, in many cases, is not 0.5 times the pixel pitch (in the following, referred to as "0.5 pixels") between different imaging regions as shown in FIG. 18 due to forming errors or mounting errors of the lens, the subject distance, the temperature, or the like. In FIG. 18, numeral 502*a* denotes an imaging region for receiving red light, numeral 502*b* denotes an imaging region for receiving green light, numeral 502*c* denotes an imaging region for receiving blue light, and numeral 502*d* denotes an imaging region for receiving green light. Numerals 702*a*, 702*b*, 702*c*, and 702*d* denote pixels forming the respective imaging regions 502*a*, 502*b*, 502*c*, and 502*d*, and numerals 701*a*, 701*b*, 701*c*, and 701*d* denote positions of subject images in the respective imaging regions 502*a*, 502*b*, 502*c*, and 502*d*. In order to obtain a high-resolution synthesized image, the shifting amount between the imaging region 502*c* and the imaging region 502*b* aligned in the horizontal direction ideally is 0.5 pixels in the horizontal direction and 0 pixels in the vertical direction. In FIG. 18, however, the shifting amount is 0.6 pixels in the horizontal direction and 0.1 pixels in the vertical direction. Further, in order to obtain a high-resolution synthesized image, the shifting amount between the imaging region 502*a* and the imaging region 502*b* aligned in the vertical direction ideally is 0 pixels in the horizontal direction and 0.5 pixels in the vertical direction. In FIG. 18, however, the shifting amount is 0.1 pixels in the horizontal direction and 0.4 pixels in the vertical direction. Furthermore, in order to obtain a high-resolution synthesized image, the shifting amount between the imaging region 502*d* and the imaging region 502*b* ideally is 0.5 pixels in the horizontal direction and 0.5 pixels in the vertical direction. In FIG. 18, the shifting amount is 0.5 pixels in the horizontal direction and 0.5 pixels in the vertical direction. A description will be given, with reference to FIGS. 19A to 19D, of an image to be obtained by synthesizing a plurality of images obtained from the plurality of imaging regions using the pixel shifting technology in the case of the positional relationships between the pixels in the plurality of imaging regions and the plurality of subject images being as shown in FIG. 18.

FIG. 19A is a view showing a subject image formed on the imaging region 502b in the case of capturing an image of three black lines (subject) extending in the vertical direction on a white background. FIG. 19B is a view showing a synthesized image obtained by synthesizing a plurality of images obtained from the plurality of imaging regions 502a, 502b, 502c, and 502d using the pixel shifting technology in the case where the pixels in the plurality of imaging regions and the plurality of subject images have the positional relationships shown in FIG. 18. FIG. 19C is a view showing a synthesized image obtained by synthesizing a plurality of images obtained from the plurality of imaging regions 502a, 502b, 502c, and 502d using the pixel shifting technology in the case where the plurality of imaging regions and the plurality of subject images have the ideal positional shifting relationship. FIG. 19D is a view showing an image obtained from the imaging region 502b. In FIGS. 19A to 19D, shading is expressed by the density of lines such that a darker color is expressed by a higher line density and a lighter color is expressed by a lower line density. Although the synthesized image as shown in FIG. 19B obtained in the case where the shifting amounts of the plurality of subject images with respect to the plurality of imaging regions deviate from the ideal values allows easy identification of the three black lines and has an improved resolution as compared with the image shown in FIG. 19D before the synthesis of the plurality of images, this synthesized image includes noticeable color irregularity as compared with the synthesized image as shown in FIG. 19C obtained in the case where the shifting amounts of the plurality of subject images with respect to the plurality of imaging regions are the ideal values.

It is an object of the present invention to solve the conventional problems described above and to provide a thin compound-eye imaging device that always can obtain a high-resolution and high-quality image regardless of the subject distance.

Means for Solving Problem

An imaging device of the present invention includes a plurality of lenses arranged in the same plane, and a plurality of imaging regions for respectively receiving a plurality of subject images formed by the plurality of lenses. Vertical line directions and horizontal line directions of a pixel arrangement in the respective plurality of imaging regions are equal to one another among the plurality of imaging regions.

In a first imaging device of the present invention, at least one pair of subject images received by at least one pair of imaging regions having a parallax in the vertical line direction among the plurality of imaging regions are shifted from each other by a predetermined amount in the horizontal line direction.

In a second imaging device of the present invention, at least one pair of subject images received by at least one pair of imaging regions having a parallax in the horizontal line direction among the plurality of imaging regions are shifted from each other by a predetermined amount in the vertical line direction.

Effects of the Invention

In accordance with the present invention, it is possible to realize a thin compound-eye imaging device that can obtain a high-resolution and high-quality image.

DESCRIPTION OF THE INVENTION

Figure 1:
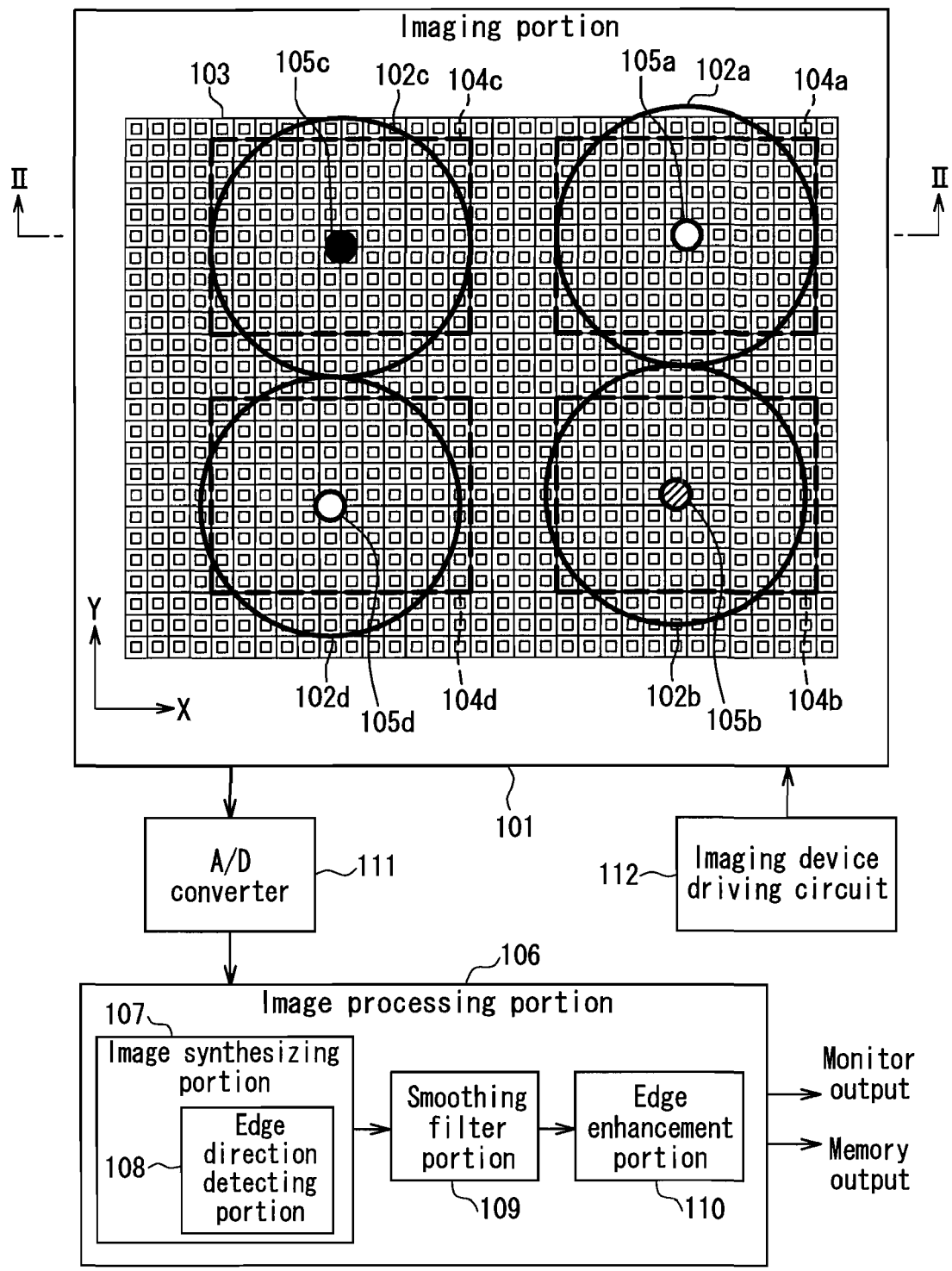
FIG. 1 is a view showing a schematic configuration of an imaging device according to an embodiment of the present invention.

In a first imaging device of the present invention, at least one pair of subject images received by at least one pair of imaging regions having a parallax in the vertical line direction among the plurality of imaging regions are shifted from each other by a predetermined amount in the horizontal line direction. Therefore, it always is possible to make the resolution in the horizontal line direction higher regardless of the subject distance such that, for example, an image of a thin line extending in the vertical line direction can be seen with higher definition.

In a second imaging device of the present invention, at least one pair of subject images received by at least one pair of imaging regions having a parallax in the horizontal line direction among the plurality of imaging regions are shifted from each other by a predetermined amount in the vertical line direction. Therefore, it always is possible to make the resolution in the vertical line direction higher regardless of the subject distance such that, for example, an image of a thin line extending in the horizontal line direction can be seen with higher definition.

In the first and second imaging devices of the present invention, the predetermined amount preferably is in a range from 0.25 to 0.75 times a pixel pitch in the plurality of imaging regions in the direction of shifting by the predetermined amount. Therefore, it always is possible to make the resolution in the horizontal line direction or the vertical line direction higher regardless of the subject distance. It should be noted that the "direction of shifting by the predetermined amount" is called the "pixel shifting direction" in the present invention.

In the first and second imaging devices of the present invention, a plurality of color filters preferably are provided between the plurality of lenses and the plurality of imaging regions. Therefore, it is possible to realize a thin imaging device capable of capturing a color image.

In this case, at least two of the plurality of color filters preferably have the same spectral transmittance characteristics. Therefore, it is possible to capture a color image with a small thickness, and to synthesize subject images with high accuracy.

The first and second imaging devices of the present invention preferably further include an image processor for processing a plurality of image data output respectively from the plurality of imaging regions. In this case, the image processor preferably includes an image synthesizer for synthesizing the plurality of image data to produce and output synthesized image data having a resolution higher than resolutions of the plurality of image data, and the image synthesizer preferably includes an edge direction detector for detecting a direction of an edge in a local region included in at least one of the plurality of image data. Further, the image synthesizer preferably changes a method for synthesizing the plurality of image data based on the direction of the edge determined by the edge direction detector. Therefore, even in the case where the predetermined amount is not strictly 0.5 times the pixel pitch in the plurality of imaging regions in the direction of shifting by the predetermined amount, it always is possible to output a high-resolution image with less color irregularity and with smoothly varying shading when the predetermined amount is not less than 0.25 times and not more than 0.75 times the pixel pitch.

In this case, it is preferable that when the edge direction detector determines that the edge direction in the local region is the same as the vertical line direction, the image synthesizer arranges the same pixel signal values continuously in a vertical direction in the local region of the synthesized image data. Therefore, even in the case where the predetermined amount is not strictly 0.5 times the pixel pitch in the plurality of imaging regions in the direction of shifting by the predetermined amount, it always is possible to output an imaging region having an edge extending in the vertical line direction with a high resolution and with less color irregularity when the predetermined amount is not less than 0.25 times and not more than 0.75 times the pixel pitch.

Alternatively, it is preferable that when the edge direction detector determines that the edge direction in the local region is the same as the vertical line direction, the image synthesizer arranges in the horizontal line direction pixel signal values of at least two of the plurality of image data that are shifted from each other in the horizontal line direction, and arranges between two adjacent pixels in the vertical line direction an interpolated value of pixel signal values of the two pixels in the local region of the synthesized image data. Therefore, even in the case where the predetermined amount is not strictly 0.5 times the pixel pitch in the plurality of imaging regions in the direction of shifting by the predetermined amount, it always is possible to output an imaging region having an edge extending in the vertical line direction with a high resolution, with less color irregularity, and with smoothly varying shading when the predetermined amount is not less than 0.25 times and not more than 0.75 times the pixel pitch.

Further, it is preferable that when the edge direction detector determines that the edge direction in the local region is the same as the horizontal line direction, the image synthesizer arranges the same pixel signal values continuously in a horizontal direction in the local region of the synthesized image data. Therefore, even in the case where the predetermined amount is not strictly 0.5 times the pixel pitch in the plurality of imaging regions in the direction of shifting by the predetermined amount, it always is possible to output an imaging region having an edge extending in the horizontal line direction with a high resolution and with less color irregularity when the predetermined amount is not less than 0.25 times and not more than 0.75 times the pixel pitch.

Alternatively, it is preferable that when the edge direction detector determines that the edge direction in the local region is the same as the horizontal line direction, the image synthesizer arranges in the vertical line direction pixel signal values of at least two of the plurality of image data that are shifted from each other in the vertical line direction, and arranges between two adjacent pixels in the horizontal line direction an interpolated value of pixel signal values of the two pixels in the local region of the synthesized image data. Therefore, even in the case where the predetermined amount is not strictly 0.5 times the pixel pitch in the plurality of imaging regions in the direction of shifting by the predetermined amount, it always is possible to output an imaging region having an edge extending in the horizontal line direction with a high resolution, with less color irregularity, and with smoothly varying shading when the predetermined amount is not less than 0.25 times and not more than 0.75 times the pixel pitch.

Furthermore, it is preferable that when the edge direction detector determines that the edge direction in the local region is inclined with respect to the vertical line direction, the image synthesizer arranges the same pixel signal values continuously in the edge direction in the local region of the synthesized image data. Therefore, even in the case where the predetermined amount is not strictly 0.5 times the pixel pitch in the plurality of imaging regions in the direction of shifting by the predetermined amount, it always is possible to output an imaging region having an edge extending in the oblique direction with a high resolution and with less color irregularity when the predetermined amount is not less than 0.25 times and not more than 0.75 times the pixel pitch.

Alternatively, it is preferable that when the edge direction detector determines that the edge direction in the local region is inclined with respect to the vertical line direction, the image synthesizer arranges pixel signal values of at least two of the plurality of image data that are shifted from each other in the horizontal line direction or the vertical line direction and an interpolated value of pixel signal values of two adjacent pixels in the edge direction in the local region of the synthesized image data. Therefore, even in the case where the predetermined amount is not strictly 0.5 times the pixel pitch in the plurality of imaging regions in the direction of shifting by the predetermined amount, it always is possible to output an imaging region having an edge extending in the oblique direction with a high resolution, with less color irregularity, and with smoothly varying shading when the predetermined amount is not less than 0.25 times and not more than 0.75 times the pixel pitch.

The first and second imaging devices of the present invention preferably further include an image processor for processing a plurality of image data output respectively from the plurality of imaging regions. In this case, the image processor preferably includes an image synthesizer for synthesizing the plurality of image data to produce and output synthesized image data having a resolution higher than resolutions of the plurality of image data. Further, the image synthesizer preferably selects a plurality of image data to be used for synthesis from the plurality of image data in accordance with the shifting amounts of the plurality of imaging regions. Therefore, even in the case where the predetermined amount of shifting of at least the pair of subject images varies due to a change in subject distance, temperature, or the like, appropriate image data always are selected so that synthesized image data is output, whereby it always is possible to output a high-resolution image with less color irregularity and with smoothly varying shading.

In this case, the image synthesizer preferably selects image data whose shifting amounts are closest to a predetermined value from the plurality of image data. Therefore, even in the case where the predetermined amount of shifting of at least the pair of subject images varies due to a change in subject distance, temperature, or the like, appropriate image data always are selected so that synthesized image data is output, whereby it always is possible to output a high-resolution image with less color irregularity and with smoothly varying shading.

Alternatively, the image synthesizer preferably selects image data whose shifting amounts are within a predetermined range from the plurality of image data. Therefore, even in the case where the predetermined amount of shifting of at least the pair of subject images varies due to a change in subject distance, temperature, or the like, appropriate image data always are selected so that synthesized image data is output, whereby it always is possible to output a high-resolution image with less color irregularity and with smoothly varying shading.

The predetermined range preferably is a range from 0.25 to 0.75 times a pixel pitch in the plurality of imaging regions in the direction of shifting by the predetermined amount. Therefore, even in the case where the predetermined amount of shifting of at least the pair of subject images varies due to a change in subject distance, temperature, or the like, appropriate image data always are selected so that synthesized image data is output, whereby it always is possible to output a high-resolution image with less color irregularity and with smoothly varying shading.

The first and second imaging devices of the present invention preferably further include an image processor for processing a plurality of image data output respectively from the plurality of imaging regions. In this case, the image processor preferably includes an image synthesizer for synthesizing the plurality of image data to produce and output synthesized image data having a resolution higher than resolutions of the plurality of image data, a smoothing filter for outputting smoothed image data obtained by smoothing a pixel signal value of each pixel of the synthesized image data or image data obtained by processing the synthesized image data, based on a pixel signal value of a pixel in a vicinity of the each pixel, and an edge enhancement filter for outputting edge-enhanced image data obtained by subjecting a pixel signal value of each pixel of the smoothed image data or image data obtained by processing the smoothed image data to edge enhancement based on a pixel signal value in a vicinity of the each pixel. Therefore, it is possible to reduce color irregularity in the synthesized image data output from the image synthesizer.

The following is a detailed description of preferred embodiments of the present invention, with reference to the accompanying drawings.

An imaging device according to the present embodiment is a thin compound-eye imaging device that includes four lenses arranged in substantially the same plane, four color filters arranged so as to correspond to the four lenses, and four imaging regions for respectively receiving four subject images formed by the four lenses, and outputs a color image and/or a monochrome image. Three of the four lenses have optical characteristics different from one another, and the remaining one has the same optical characteristics as any one of the three lenses. The four imaging regions each have a large number of pixels arranged in a matrix along vertical and horizontal directions. Among the four imaging regions, vertical line directions and horizontal line directions in which the respective pixels in the four imaging regions are arranged are equal to one another. The relative positional relationships between the imaging regions and subject images formed thereon are shifted by about 0.5 pixels in a predetermined direction between the imaging regions. The imaging device of the present embodiment always can obtain a high-resolution image with less color irregularity and with smoothly varying shading regardless of the subject distance or a temperature variation. Further, it is possible to express a curve included in a subject as a smooth curve, and to reduce color irregularity caused due to image synthesis utilizing the correlation between pieces of image information of respective colors in a local region.

Figure 2:
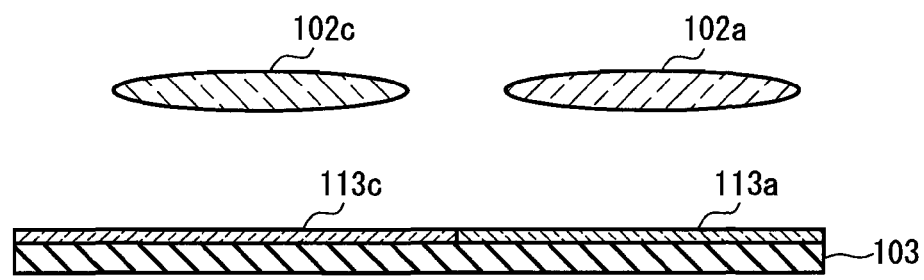
FIG. 2 is a sectional view of an imaging portion of an imaging device according to an embodiment of the present invention, taken along a line II-II in FIG. 1.

FIG. 1 shows a schematic configuration of an imaging device according to an embodiment of the present invention. FIG. 2 is a cross-sectional view of an imaging portion 101, taken along a line II-II in FIG. 1.

First, a description will be given of the principle in which the imaging device of the present embodiment outputs a color image in which parallax between the lenses has been corrected.

In FIG. 1, numeral 101 denotes the imaging portion viewed from a subject side. Light from a subject is incident on four single lenses 102a, 102b, 102c, and 102d arranged in substantially the same plane, and the four single lenses 102a, 102b, 102c, and 102d respectively form subject images on imaging regions 104a, 104b, 104c, and 104d of an imaging device 103 via color filters 113a, 113b, 113c, and 113d (see FIG. 2; the color filters 113b and 113d are not shown). As the imaging device 103, an imaging device with a large number of pixels such as 2,000,000 pixels, for example, is used. In FIG. 1, however, an imaging device with a small number of pixels, i.e., 825 pixels, is shown for the sake of simplifying the figure. In FIG. 1, individual squares aligned in the imaging device 103 in the horizontal direction (X-axis direction) and the vertical direction (Y-axis direction) in a grid pattern indicate pixels. The horizontal direction (X-axis direction) in which the pixels are aligned is called a horizontal line direction, and the vertical direction (Y-axis direction) in which the pixels are aligned is called a vertical line direction. A smaller square inside each of the squares (pixels) indicates a photodetector portion.

As shown in FIG. 2, the color filters 113a, 113b, 113c, and 113d (the color filters 113b and 113d are not shown) are arranged on the subject side of the imaging device 103. The single lenses 102a and 102d are designed to have a focal length appropriate for forming an image of a green light beam on an imaging plane of the imaging device 103, the single lens 102b is designed to have a focal length appropriate for forming an image of a red light beam on the imaging plane of the imaging device 103, and the single lens 102c is designed to have a focal length appropriate for forming an image of a blue light beam on the imaging plane of the imaging device 103. On top of the imaging plane of the imaging device 103, the color filters 113a and 113d transmitting green light to the imaging regions 104a and 104d corresponding to the single lenses 102a and 102d are arranged, the color filter 113b transmitting red light to the imaging region 104b corresponding to the single lens 102b is arranged, and the color filter 113c transmitting blue light to the imaging region 104c corresponding to the single lens 102c is arranged. Accordingly, a subject image due to a green light component is formed on the imaging regions 104a and 104d, a subject image due to a red light component is formed on the imaging region 104b, and a subject image due to a blue light component is formed on the imaging region 104c. The subject images formed respectively on the imaging regions 104a, 104b, 104c, and 104d are shifted respectively with respect to optical axes 105a, 105b, 105c, and 105d by a parallax amount S, which is calculated by (Formula 1) when A indicates the subject distance, d indicates the distance between the optical axes of the lenses, and f indicates the focal length.

The imaging device 103 formed of a solid-state imaging device such as a CCD and a CMOS is controlled by an imaging device driving circuit 112 concerning the exposure time, the timings for taking and transferring a signal, and the like. An analog signal value, output from the imaging portion 101, of the amount of light received by each of the pixels is converted into a digital signal by an A/D converter 111, and the digital signal is input to an image processing portion 106. The digitalized image data of the imaging regions 104a, 104b, 104c, and 104d input to the image processing portion 106 are subjected to processing such as white balance correction and shading correction.

Figure 3:
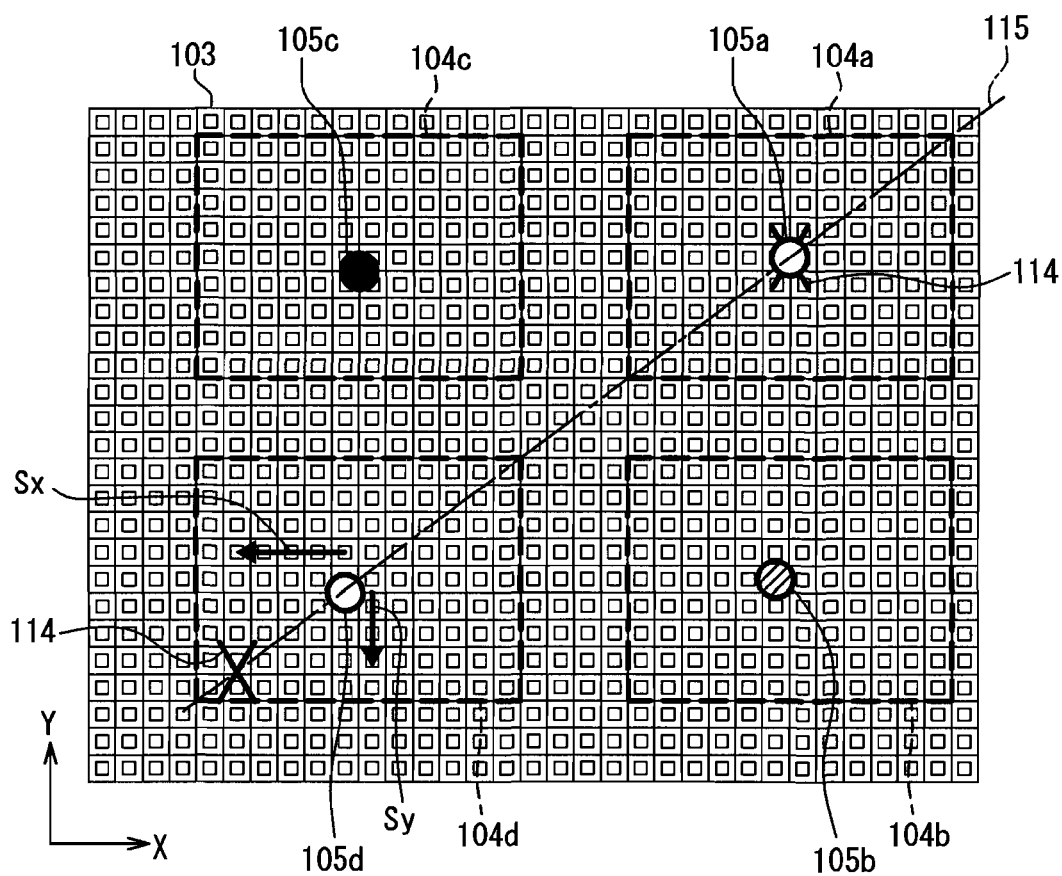
FIG. 3 is a view for illustrating the principle in which parallax is generated in an imaging device according to an embodiment of the present invention.

FIG. 3 shows a subject image 114, formed on the imaging regions 104a and 104d, of a subject located at a subject distance A0 on the optical axis 105a of the single lens 102a. The subject image 114 is formed on the optical axis 105a on the imaging region 104a, and is formed, on the imaging region 104d, at a position away from the optical axis 105d by a distance Sxy on a straight line 115 connecting the optical axis 105a and the optical axis 105d.

When dx indicates the distance between the optical axis 105a and the optical axis 105d in the X-axis direction, a parallax Sx of the subject image 114 between the imaging region 104a and the imaging region 104d in the X-axis direction is expressed by (Formula 2).

$$Sx = \frac{f \times dx}{A0} \quad \text{[Formula 2]}$$

When dy indicates the distance between the optical axis 105a and the optical axis 105d in the Y-axis direction, a parallax Sy of the subject image 114 between the imaging region 104a and the imaging region 104d in the Y-axis direction is expressed by (Formula 3).

$$Sy = \frac{f \times dy}{A0} \quad \text{[Formula 3]}$$

Accordingly, the distance Sxy is expressed by (Formula 4).

$$Sxy = \sqrt{Sx^2 + Sy^2}$$ [Formula 4]

An image synthesizing portion 107 performs a computation for obtaining the correlation between the subject images using the two pieces of image data output from the imaging region 104a and the imaging region 104d where the subject images of the same color (green) are formed, so as to calculate the parallaxes Sx and Sy. Although the pixels exist only in integer coordinates on the imaging device 103, the parallaxes Sx and Sy at the decimal level also can be calculated by performing an interpolating computation such as linear interpolation.

Since the distance between the optical axis 105a and the optical axis 105d in the X-axis direction is substantially equal to the distance between the optical axis 105a and the optical axis 105c, the calculated parallax Sx is used as a parallax amount of the subject image between the imaging region 104a and the imaging region 104c. An error between the distance between the optical axis 105a and the optical axis 105d in the X-axis direction and the distance between the optical axis 105a and the optical axis 105c is compensated by, for example, comparing the positions of a subject image, formed on the respective imaging regions 104a, 104c, and 104d, of a subject (e.g., a white point light source on a black background) located at infinity.

Similarly, since the distance between the optical axis 105a and the optical axis 105d in the Y-axis direction is substantially equal to the distance between the optical axis 105a and the optical axis 105b, the calculated parallax Sy is used as a parallax amount of the subject image between the imaging region 104a and the imaging region 104b. An error between the distance between the optical axis 105a and the optical axis 105d in the Y-axis direction and the distance between the optical axis 105a and the optical axis 105b is compensated by a method similar to the above-described method for compensating the error in the distance in the X-axis direction.

Using the calculated parallaxes Sx and Sy the image synthesizing portion 107 corrects the shifting of an image from the imaging region 104b where the subject image due to red light component is formed and the shifting of an image from the imaging region 104c where the subject image due to blue light component is formed with respect to an image from the imaging region 104a where the subject image due to green light component is formed, and then synthesizes these three images. In this way, a color image of the subject image can be obtained.

Next, a description will be given of the principle in which the imaging device in FIG. 1 always outputs a high-resolution image regardless of the subject distance.

Figure 4:
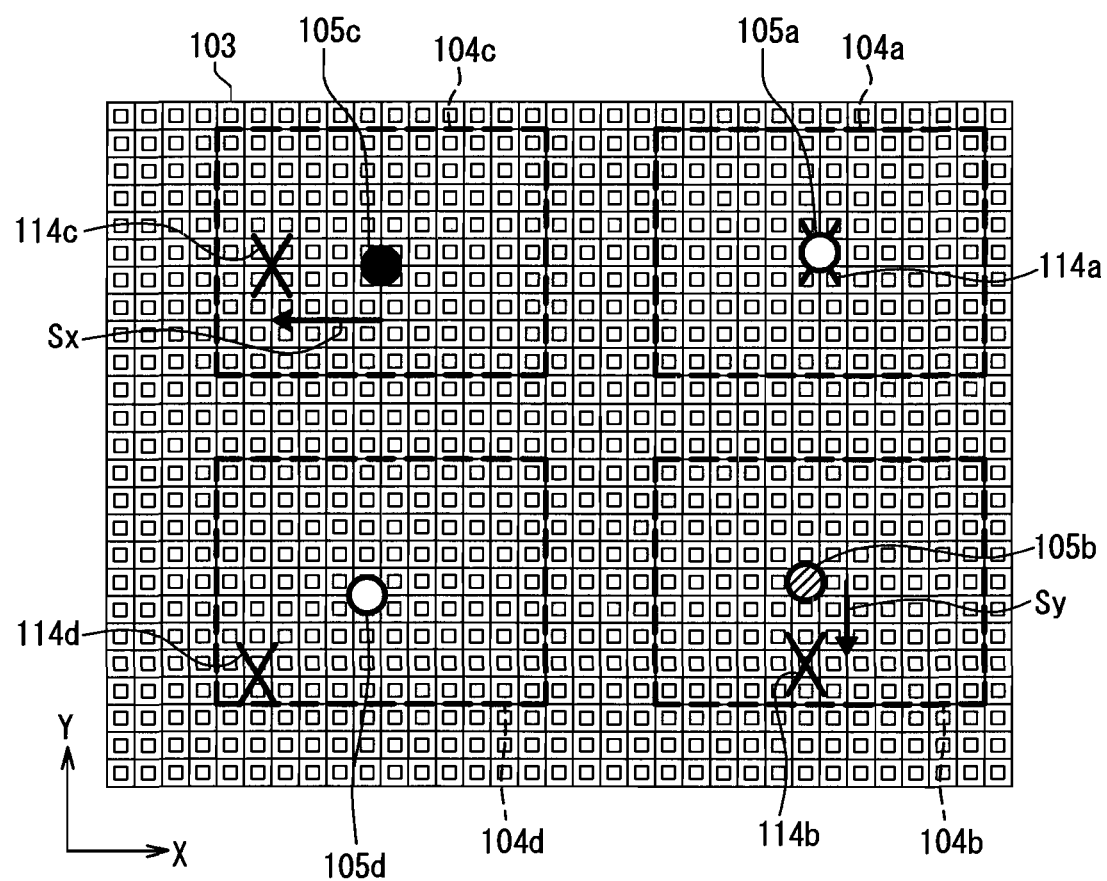
FIG. 4 is a view illustrating the principle of correcting parallax in an imaging device according to an embodiment of the present invention.

FIG. 4 shows the positions of subject images 114a to 114d, formed on the imaging regions 104a to 104d, of a subject located at a subject distance A0 on the optical axis 105a of the single lens 102.

On the imaging region 104a, the subject image 114a exists on the optical axis 105a.

The position of the optical axis 105c in the imaging region 104c is shifted with respect to the position of the optical axis 105a in the imaging region 104a by about 0.5 pixels in the negative direction of the Y axis. The subject image 114c is formed at a position away from the optical axis 105c by the parallax Sx obtained by (Formula 2) in the negative direction of the X axis.

The position of the optical axis 105b in the imaging region 104b is shifted with respect to the position of the optical axis 105a in the imaging region 104a by about 0.5 pixels in the negative direction of the X axis. The subject image 114b is formed at a position away from the optical axis 105b by the parallax Sy obtained by (Formula 3) in the negative direction of the Y axis.

Although in FIG. 4, an imaging device with pixels whose number is smaller than the actual number is shown as the imaging device 103 for the sake of simplifying the description, an imaging device with a large number of pixels such as 2,000,000 pixels is used in actuality. Thus, the shifting amount between the optical axis 105a and the optical axis 105c in the Y-axis direction is so small that the parallax of the subject image 114c on the imaging region 104c in the Y-axis direction can be ignored. Similarly, the shifting amount between the optical axis 105a and the optical axis 105b in the X-axis direction also is so small that the parallax of the subject image 114b on the imaging region 104b in the X-axis direction can be ignored.

Therefore, when the subject distance A0 varies, the subject image 114c moves along the X-axis direction in the imaging region 104c. At this time, the subject image 114c moves along the X-axis direction in a state where it always is shifted with respect to the optical axis 105a by about 0.5 pixels in the Y-axis direction.

Further, when the subject distance A0 varies, the subject image 114b moves along the Y-axis direction in the imaging region 104b. At this time, the subject image 114b moves along the Y-axis direction in a state where it always is shifted with respect to the optical axis 105a by about 0.5 pixels in the X-axis direction.

In other words, the subject image 114c on the imaging region 104c always is shifted with respect to the subject image 114a on the imaging region 104a by about 0.5 pixels in the negative direction of the Y axis regardless of the subject distance, and the subject image 114b on the imaging region 104b always is shifted with respect to the subject image 114a on the imaging region 104a by about 0.5 pixels in the negative direction of the X axis regardless of the subject distance.

Figure 5:
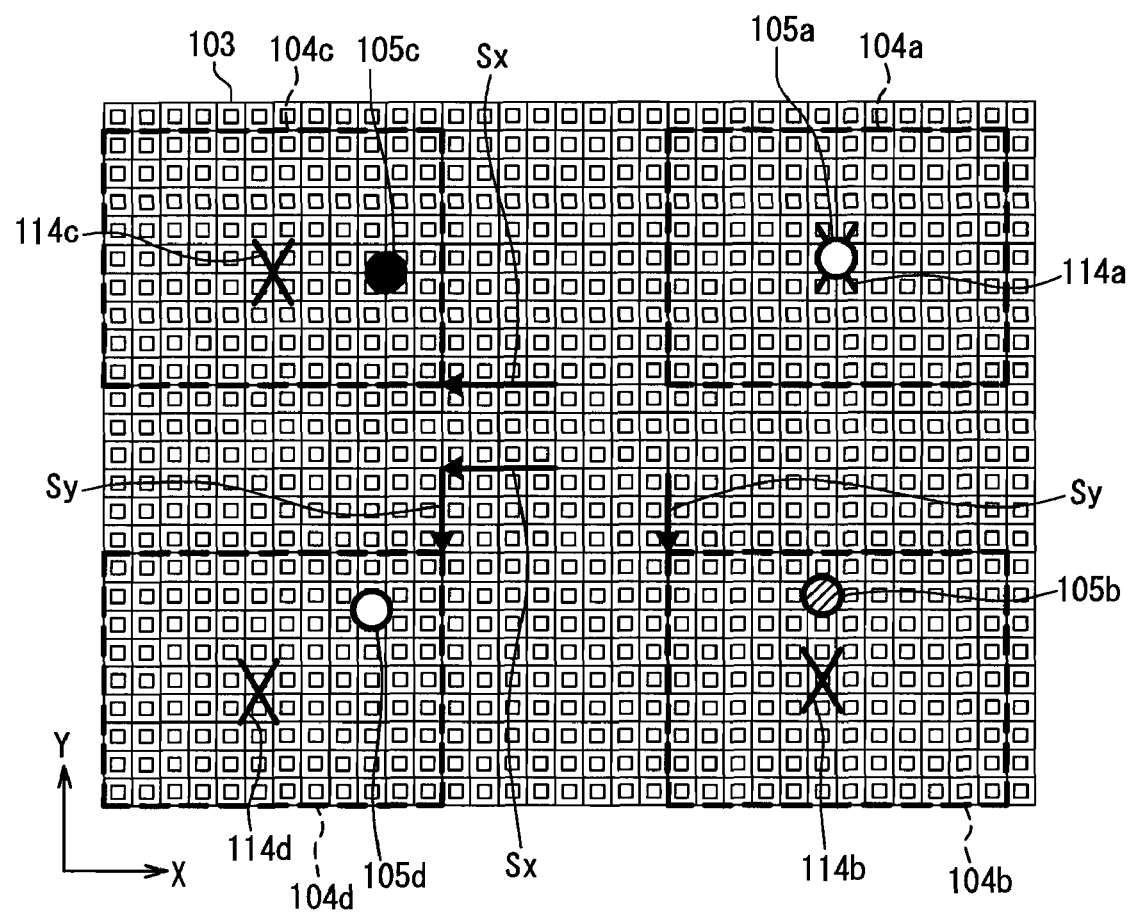
FIG. 5 is a view illustrating a method for correcting parallax in an imaging device according to an embodiment of the present invention.

The correction of the shifting of the images due to the parallaxes is performed using the calculated parallaxes Sx and Sy in the following manner. As shown in FIG. 5, the imaging region 104c is corrected by Sx in the X-axis direction. Further, the imaging region 104b is corrected by Sy in the Y-axis direction. Furthermore, the imaging region 104d is corrected by Sx in the X-axis direction and by Sy in the Y-axis direction. It should be noted that since coordinate values of the respective imaging regions are only integers, processing such as rounding is performed when the correction amounts Sx and Sy include a decimal fraction.

The imaging regions 104a to 104d each have m×n (height× width) pixels. It is assumed that coordinates of each pixel in the imaging region 104a are a(x, y), coordinates of each pixel in the imaging region 104b are b(x, y), coordinates of each pixel in the imaging region 104c are c(x, y), and coordinates of each pixel in the imaging region 104d are d(x, y), where x=1, 2, . . . , m, and y=1, 2, . . . , n. The pixel c(x, y) in the imaging region 104c receives a subject image located at a position shifted with respect to the pixel a(x, y) in the imaging region 104a by about 0.5 pixels in the positive direction of the Y axis. Further, the pixel b(x, y) in the imaging region 104b receives a subject image located at a position shifted with respect to the pixel a(x, y) in the imaging region 104a by about 0.5 pixels in the positive direction of the X axis. The shifting amount of the subject image received by the pixel d(x, y) in the imaging region 104d with respect to the subject image received by the pixel a(x, y) in the imaging region 104a in the X-axis direction and the Y-axis direction varies depending on the subject distance.

Figure 6A:
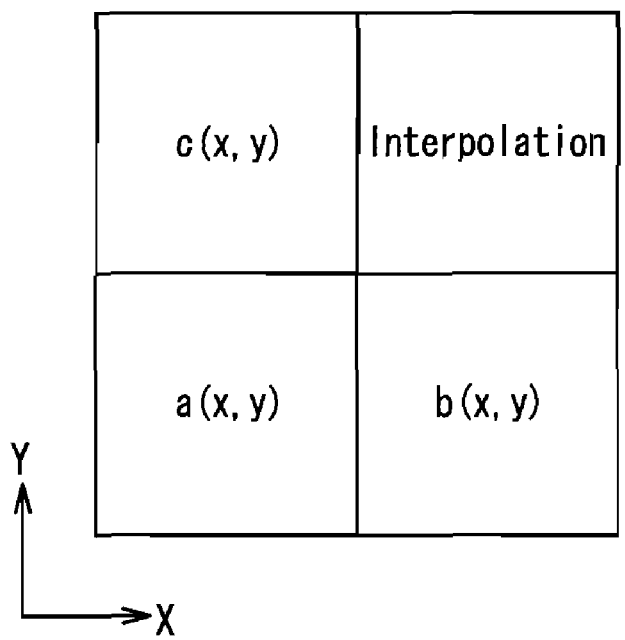
FIG. 6A is a view illustrating an exemplary method for synthesizing images in an imaging device according to an embodiment of the present invention.

Therefore, in order to produce a high-resolution synthesized image h with 2·m×2·n (height×width) pixels from the images, each with m×n pixels, shifted by about 0.5 pixels in each of the X-axis direction and the Y-axis direction, as shown in FIG. 6A, the brightness value of the pixel a(x, y) is substituted into coordinates h(2·x−1, 2·y−1) of the synthesized image, the brightness value of the pixel c(x, y) is substituted into coordinates h(2·x−1, 2·y), the brightness value of the pixel b(x, y) is substituted into coordinates h(2·x, 2·y−1), and an average of the brightness values of four adjacent pixels is substituted into coordinates h(2·x, 2·y) (x=1, 2, . . . , m, and y=1, 2, . . . , n). Here, instead of the average of the brightness values of four adjacent pixels, a value calculated by another interpolation method using the brightness values of adjacent pixels also may be substituted into the coordinates h(2·x, 2·y).

Figure 6B:
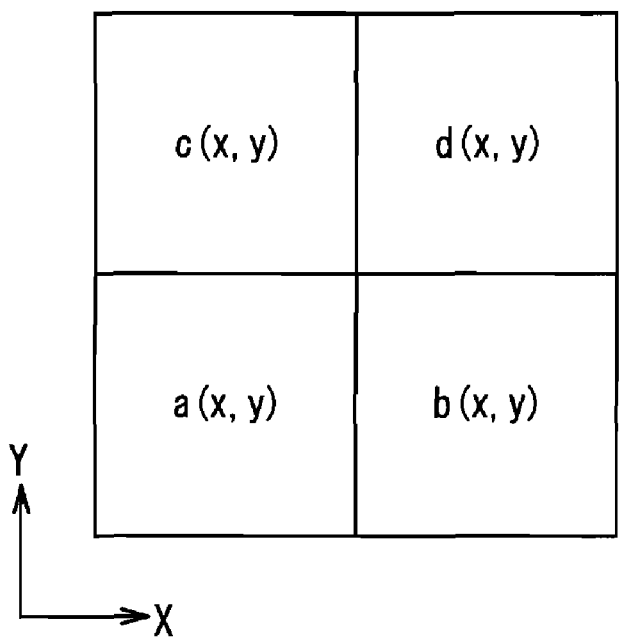
FIG. 6B is a view illustrating another exemplary method for synthesizing images in an imaging device according to an embodiment of the present invention.

Depending on the subject distance, the pixel d(x, y) in the imaging region 104d sometimes receives the subject image 114 that is shifted with respect to the pixel a(x, y) in the imaging region 104a by about 0.5 pixels in the positive direction of the X axis and by about 0.5 pixels in the positive direction of the Y axis. In such a case, as shown in FIG. 6B, the brightness value of the pixel a(x, y) is substituted into the coordinates h(2·x−1, 2·y−1) of the synthesized image, the brightness value of the pixel c(x, y) is substituted into the coordinates h(2·x−1, 2·y), the brightness value of the pixel b(x, y) is substituted into the coordinates h(2·x, 2·y−1), and the brightness value of the pixel d(x, y) is substituted into the coordinates h(2·x, 2·y).

Figure 7A:
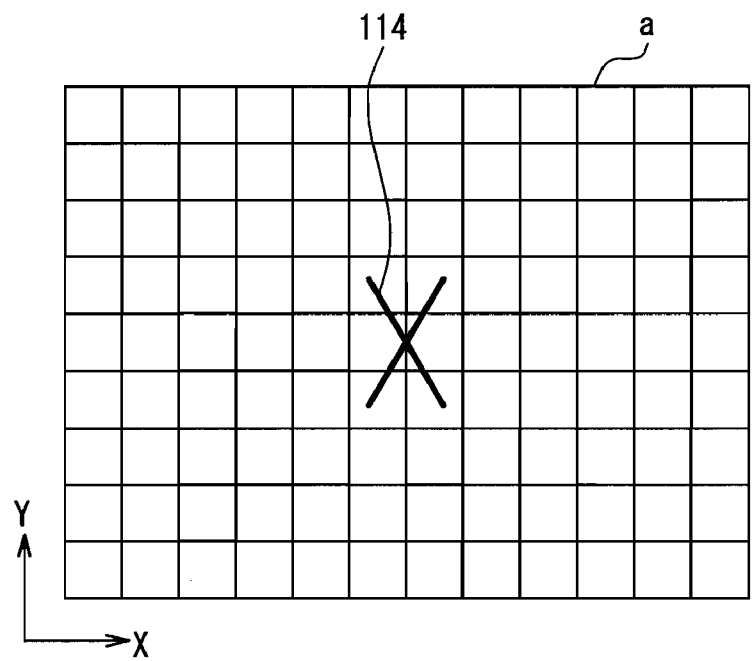
FIG. 7A is a view showing an image with m×n pixels obtained from one imaging region in an imaging device according to an embodiment of the present invention.
Figure 7B:
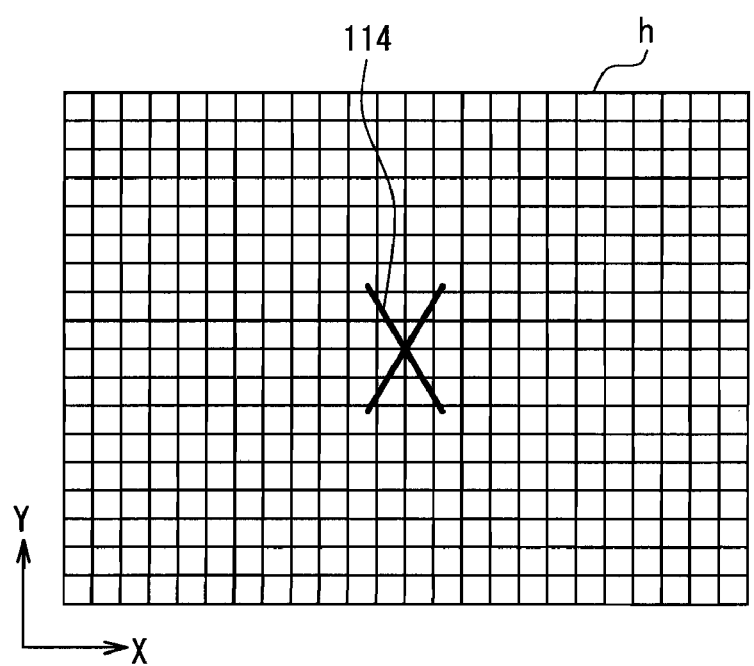
FIG. 7B is a view showing a high-resolution image with 2·m×2·n pixels obtained by image synthesis in an imaging device according to an embodiment of the present invention.

As described above, the synthesized image h with 2·m×2·n pixels can be produced from the four images, each with m×n pixels, that are shifted from each other and are obtained from the imaging regions 104a, 104b, 104c, and 104d. In other words, by synthesizing four images, each with m×n pixels, obtained respectively from the imaging regions 104a, 104b, 104c, and 104d as shown in FIG. 7A, a high-resolution image with 2·m×2·n pixels can be obtained as shown in FIG. 7B.

In the case of a monochrome subject, a high-resolution synthesized image can be produced by the method as described above. However, in the case of a color subject, three synthesized images of red, green, and blue are produced. It is assumed that a synthesized image having red color information is hr, a synthesized image having green color information is hg, and a blue synthesized image is hb. Utilizing the characteristics that pieces of image information of red, green, and blue are correlated in a local region of an image, the synthesized images hr, hg, and hb are produced. A matrix c_rg indicating the correlation between the pieces of image information of red and green, a matrix c_bg indicating the correlation between the pieces of image information of blue and green, and a matrix c_br indicating the correlation between the pieces of image information of blue and red are calculated by (Formulae 5).

$$c\_rg(x,y)=b(x,y)/a(x,y)$$

$$c\_bg(x,y)=c(x,y)/a(x,y)$$

$$c\_br(x,y)=c(x,y)/b(x,y) \quad \text{[Formulae 5]}$$

(x=1, 2, . . . , m, y=1, 2, . . . , n)

Then, the respective matrices obtained by (Formulae 5) are subjected to a median filter so as to remove noise, thus calculating matrices median_c_rg, median_c_bg, and median_c_br of (Formulae 6).

$$\text{median}\_c\_rg=\text{median}(c\_rg)$$

$$\text{median}\_c\_bg=\text{median}(c\_bg)$$

$$\text{median}\_c\_br=\text{median}(c\_br) \quad \text{[Formulae 6]}$$

Thereafter, the respective matrices obtained by (Formulae 6) are subjected to a low-pass filter with a weighting factor, thus calculating LPF_c_rg, LPF_c_bg, and LPF_c_br of (Formulae 7).

$$LPF\_c\_rg=lpf(\text{median}\_c\_rg)$$

$$LPF\_c\_bg=lpf(\text{median}\_c\_bg)$$

$$LPF\_c\_br=lpf(\text{median}\_c\_br) \quad \text{[Formulae 7]}$$

Using LPF_c_rg, LPF_c_bg, and LPF_c_br indicating the correlations between the respective colors in a local region, the synthesized image hr having red color information, the synthesized image hg having green color information, and the blue synthesized image hb are produced.

The synthesized image hr having red color information is produced using (Formulae 8).

$$hr(2\cdot x-1,2\cdot y-1)=a(x,y)\cdot LPF\_c\_rg(x,y)$$

$$hr(2\cdot x,2\cdot y-1)=b(x,y)$$

$$hr(2\cdot x-1,2\cdot y)=c(x,y)/LPF\_c\_br(x,y) \quad \text{[Formulae 8]}$$

hr(2·x,2·y): average of four adjacent values
(x=1, 2, . . . , m, y=1, 2, . . . , n)

The synthesized image hg having green color information is produced using (Formulae 9).

$$hg(2\cdot x-1,2\cdot y-1)=a(x,y)$$

$$hg(2\cdot x,2\cdot y-1)=b(x,y)/LPF\_c\_rg(x,y)$$

$$hg(2\cdot x-1,2\cdot y)=c(x,y)/LPF\_c\_bg(x,y) \quad \text{[Formulae 9]}$$

hg(2·x,2·y): average of four adjacent values
(x=1, 2, . . . , m, y=1, 2, . . . , n)

The synthesized image hb having blue color information is produced using (Formulae 10).

$$hb(2\cdot x-1,2\cdot y-1)=a(x,y)\cdot LPF\_c\_bg(x,y)$$

$$hb(2\cdot x,2\cdot y-1)=b(x,y)\cdot LPF\_c\_br(x,y)$$

$$hb(2\cdot x-1,2\cdot y)=c(x,y) \quad \text{[Formulae 10]}$$

hb(2·x,2·y): average of four adjacent values
(x=1, 2, . . . , m, y=1, 2, . . . , n)

Figure 8:
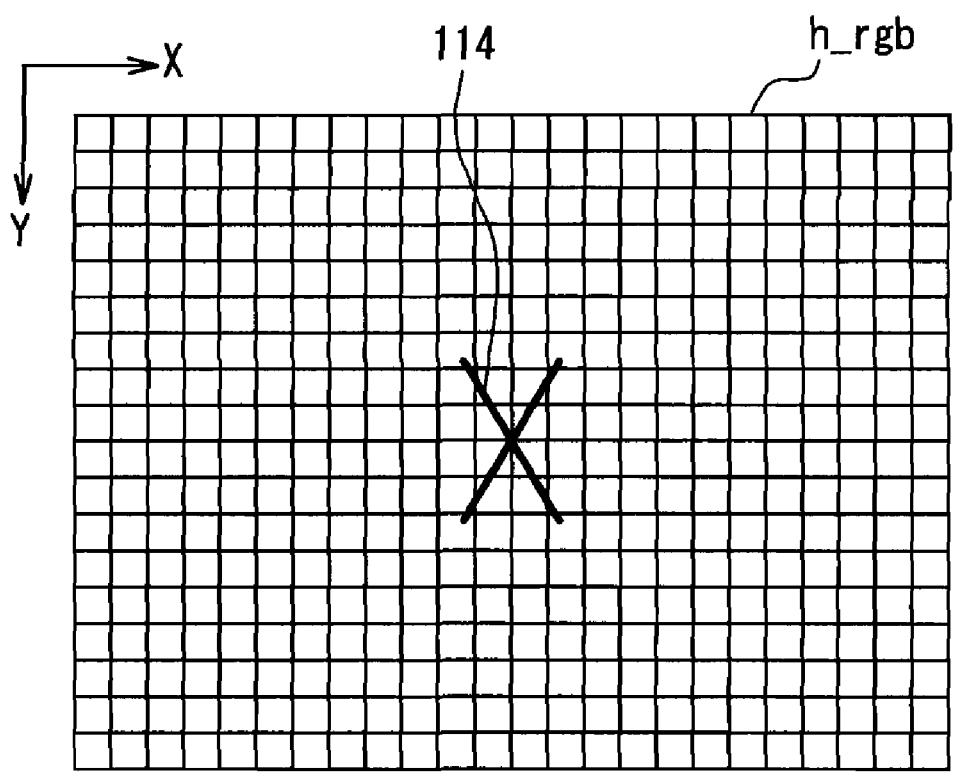
FIG. 8 is a view showing a synthesized color image in an imaging device according to an embodiment of the present invention.

By subjecting the calculated synthesized images hr, hg, and hb of red, green, and blue to color synthesis, a high-resolution color synthesized image h_rgb with 2·m×2·n pixels is obtained. Considering the fact that the subject images formed on the imaging device 103 are reversed by the lenses 102a to 102d, the pixel arrangement of the color synthesized image h_rgb is reversed in the Y-axis direction as shown in FIG. 8.

Next, a description will be given of the principle in which the imaging device in FIG. 1 always can output a high-resolution image with less color irregularity even in the case where the shifting amounts between the four subject images projected by the four lenses deviate from an ideal shifting amount of 0.5 pixels.

Figure 9:
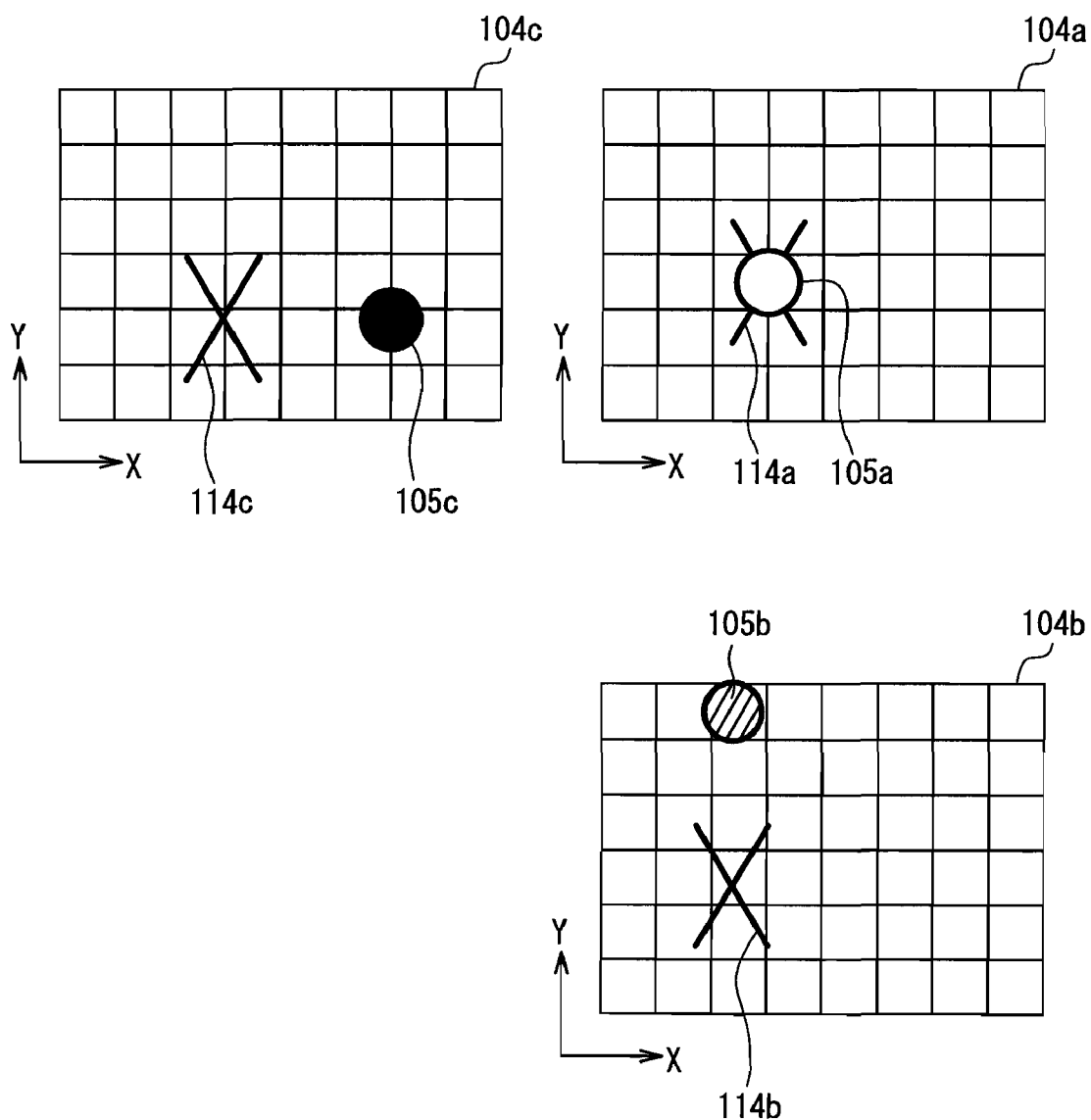
FIG. 9 is a partially enlarged view showing positions of subject images and optical axes in imaging regions in an imaging device according to an embodiment of the present invention.

In many cases, the shifting amounts of the optical axes 105a to 105d in the imaging regions 104a to 104d in FIG. 1 are not an ideal shifting amount of 0.5 pixels in respective pixel shifting directions due to forming errors of the lenses 102a to 102d, mounting errors in the mounting of the lenses, or the like. FIG. 9 is an enlarged view showing the subject images 114a to 114c, the optical axes 105a to 105c, and pixels in the vicinity thereof in the imaging regions 104a to 104c. FIG. 9 shows the relationships between the subject images 114a to 114c and the optical axes 105a to 105c after the parallax correction processing.

The subject image 114c on the imaging region 104c is shifted with respect to the subject image 114a on the imaging region 104a by 0.6 pixels in the negative direction of the Y axis and by 0.1 pixels in the negative direction of the X axis. When the subject distance varies, the subject image 114c moves along the X-axis direction while its shifting amount with respect to the subject image 114a in the Y-axis direction is kept to be substantially 0.6 pixels. At this time, when the shifting amount of the subject image 114c with respect to the subject image 114a in the Y-axis direction is within a range from 0.25 pixels to 0.75 pixels, a high-resolution synthesized image can be obtained. The parallax correction processing is performed so that the shifting amount between the subject image 114c on the imaging region 104c and the subject image 114a on the imaging region 104a in the X-axis direction is within a range of ±0.5 pixels.

The subject image 114b on the imaging region 104b is shifted with respect to the subject image 114a on the imaging region 104a by 0.1 pixels in the negative direction of the Y axis and by 0.6 pixels in the negative direction of the X axis. When the subject distance varies, the subject image 114b moves along the Y-axis direction while its shifting amount with respect to the subject image 114a in the X-axis direction is kept to be substantially 0.6 pixels. At this time, when the shifting amount of the subject image 114b with respect to the subject image 114a in the X-axis direction is within a range from 0.25 pixels to 0.75 pixels, a high-resolution synthesized image can be obtained. The parallax correction processing is performed so that the shifting amount between the subject image 114b on the imaging region 104b and the subject image 114a on the imaging region 104a in the Y-axis direction is within a range of ±0.5 pixels.

Figure 10A:
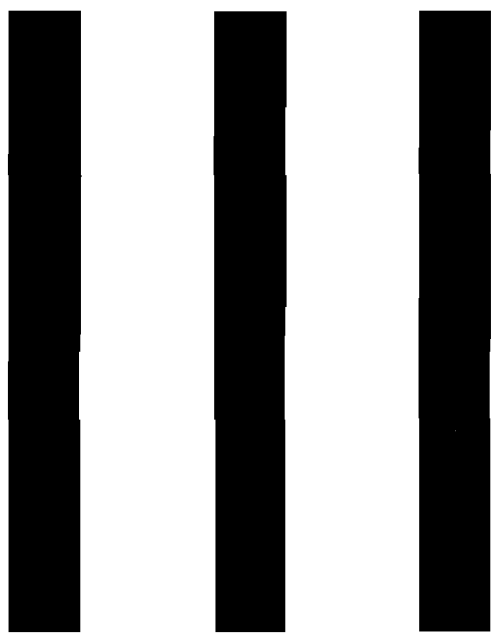
FIG. 10A is a view showing a subject image formed on one imaging region in an imaging device according to an embodiment of the present invention.
Figure 10B:
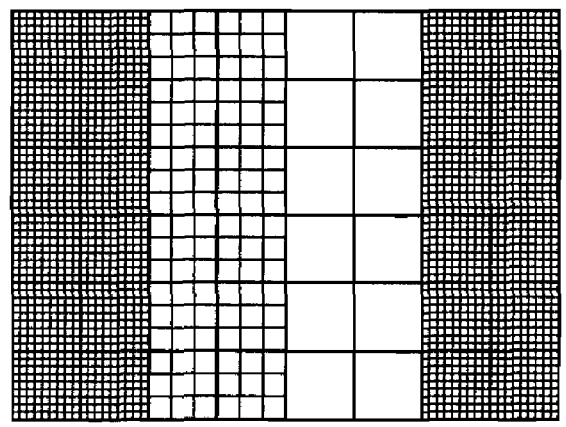
FIG. 10B is a view showing an image obtained by reversing in the vertical direction a pixel arrangement of an image obtained from one imaging region in an imaging device according to an embodiment of the present invention.
Figure 10C:
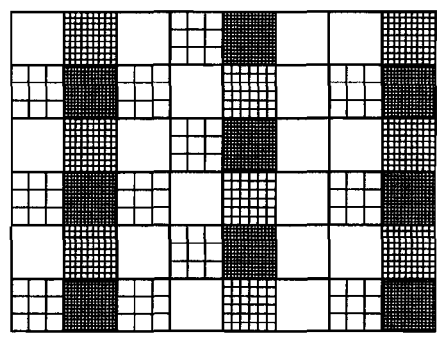
FIG. 10C is a view showing a high-resolution color synthesized image in an imaging device according to an embodiment of the present invention.

A description will be given of an output image when an image of a subject having an edge extending in the vertical direction is captured in the case of the above-described shifting amounts of the respective subject images. FIG. 10A shows a subject image, formed on the imaging device 103, of three thick lines extending in the vertical direction, FIG. 10B shows an image obtained by reversing in the Y-axis direction the pixel arrangement of an image taken by the imaging region 104a, and FIG. 10C shows a high-resolution color synthesized image h_rgb. In FIGS. 10A to 10C, shading is expressed by the density of lines such that a darker color is expressed by a higher line density and a lighter color is expressed by a lower line density.

The image in FIG. 10C allows easier identification of the subject image of the three thick lines and has a higher resolution as compared with the image in FIG. 10B. However, color irregularity occurs in the image in FIG. 10C due to the fact that the shifting amount of the subject image 114c on the imaging region 104c with respect to the subject image 114a on the imaging region 104a in the X-axis direction and the Y-axis direction deviates from an ideal shifting amount of 0 pixels in the X-axis direction and 0.5 pixels in the Y-axis direction. Thus, the direction of the edge of the subject image in a local region is detected, so that a method for synthesizing the synthesized image hr having red color information, the synthesized image hg having green color information, and the synthesized image hb having blue color information is changed in accordance with the direction of the edge in the following manner.

(Formula 11) is for calculating the intensity of an edge extending in the Y-axis direction, that is, an averaged differential component Dy(x, y) in the X-axis direction at respective coordinates in the imaging region 104a.

$$Dy(x,y)=a(x-1,y-1)+2 \cdot a(x-1,y)+a(x-1,y+1)-a(x+1,y-1)-2 \cdot a(x+1,y)-a(x+1,y+1) \quad \text{[Formula 11]}$$

(x=1, 2, . . . , m, y=1, 2, . . . , n)

(Formula 12) is for calculating the intensity of an edge extending in the X-axis direction, that is, an averaged differential component Dx(x, y) in the Y-axis direction at respective coordinates in the imaging region 104a.

$$Dx(x,y)=a(x-1,y-1)+2 \cdot a(x,y-1)+a(x+1,y-1)-a(x-1,y+1)-2 \cdot a(x,y+1)-a(x+1,y+1) \quad \text{[Formula 12]}$$

(x=1, 2, . . . , m, y=1, 2, . . . , n)

(Formula 13) is for calculating the intensity of an edge extending in the upper right oblique direction, that is, an averaged differential component Dsr(x, y) in the upper left oblique direction at respective coordinates in the imaging region 104a.

$$Dsr(x,y)=a(x-1,y)+2 \cdot a(x-1,y-1)+a(x,y-1)-a(x,y+1)-2 \cdot a(x+1,y+1)-a(x+1,y) \quad \text{[Formula 13]}$$

(x=1, 2, . . . , m, y=1, 2, . . . , n)

(Formula 14) is for calculating the intensity of an edge extending in the upper left oblique direction, that is, an averaged differential component Dsl(x, y) in the upper right oblique direction at respective coordinates in the imaging region 104a.

$$Dsl(x,y)=a(x,y-1)+2 \cdot a(x+1,y-1)+a(x+1,y)-a(x-1,y)-2 \cdot a(x-1,y+1)-a(x,y+1) \quad \text{[Formula 14]}$$

(x=1, 2, . . . , m, y=1, 2, . . . , n)

In the case where the absolute value of Dx(x, y) is the largest among the absolute values of calculated Dx(x, y), Dy(x, y), Dsr(x, y), and Dsl(x, y), the synthesized image hr having red color information is produced using (Formulae 15).

$$hr(2 \cdot x-1, 2 \cdot y-1)=a(x,y) \cdot LPF\_c\_rg(x,y)$$

$$hr(2 \cdot x, 2 \cdot y-1)=hr(2 \cdot x-1, 2 \cdot y-1)$$

$$hr(2 \cdot x-1, 2 \cdot y)=c(x,y)/LPF\_c\_br(x,y)$$

$$hr(2 \cdot x, 2 \cdot y)=hr(2 \cdot x-1, 2 \cdot y) \quad \text{[Formulae 15]}$$

(x=1, 2, . . . , m, y=1, 2, . . . , n)

The synthesized image hg having green color information is produced using (Formulae 16).

$$hg(2 \cdot x-1, 2 \cdot y-1)=a(x,y)$$

$$hg(2 \cdot x, 2 \cdot y-1)=hg(2 \cdot x-1, 2 \cdot y-1)$$

$$hg(2 \cdot x-1, 2 \cdot y)=c(x,y)/LPF\_c\_bg(x,y)$$

$$hg(2 \cdot x, 2 \cdot y)=hg(2 \cdot x-1, 2 \cdot y) \quad \text{[Formulae 16]}$$

(x=1, 2, . . . , m, y=1, 2, . . . , n)

The synthesized image hb having blue color information is produced using (Formulae 17).

$$hb(2 \cdot x-1, 2 \cdot y-1)=a(x,y) \cdot LPF\_c\_bg(x,y)$$

$$hb(2 \cdot x, 2 \cdot y-1)=hb(2 \cdot x-1, 2 \cdot y-1)$$

$$hb(2 \cdot x-1, 2 \cdot y)=c(x,y)$$

$$hb(2 \cdot x, 2 \cdot y)=hb(2 \cdot x-1, 2 \cdot y) \quad \text{[Formulae 17]}$$

(x=1, 2, . . . , m, y=1, 2, . . . , n)

In the case where the absolute value of Dy(x, y) is the largest, the synthesized image hr having red color information is produced using (Formulae 18).

$$hr(2 \cdot x-1, 2 \cdot y-1) = a(x,y) \cdot LPF\_c\_rg(x,y)$$

$$hr(2 \cdot x, 2 \cdot y-1) = b(x,y)$$

$$hr(2 \cdot x-1, 2 \cdot y) = hr(2 \cdot x-1, 2 \cdot y-1)$$

$$hr(2 \cdot x, 2 \cdot y) = hr(2 \cdot x, 2 \cdot y-1) \quad \text{[Formulae 18]}$$

(x=1, 2, ..., m, y=1, 2, ..., n)

The synthesized image hg having green color information is produced using (Formulae 19).

$$hg(2 \cdot x-1, 2 \cdot y-1) = a(x,y)$$

$$hg(2 \cdot x, 2 \cdot y-1) = b(x,y)/LPF\_c\_rg(x,y)$$

$$hg(2 \cdot x-1, 2 \cdot y) = hg(2 \cdot x-1, 2 \cdot y-1)$$

$$hg(2 \cdot x, 2 \cdot y) = hg(2 \cdot x, 2 \cdot y-1) \quad \text{[Formulae 19]}$$

(x=1, 2, ..., m, y=1, 2, ..., n)

The synthesized image hb having blue color information is produced using (Formulae 20).

$$hb(2 \cdot x-1, 2 \cdot y-1) = a(x,y) \cdot LPF\_c\_bg(x,y)$$

$$hb(2 \cdot x, 2 \cdot y-1) = b(x,y) \cdot LPF\_c\_br(x,y)$$

$$hb(2 \cdot x-1, 2 \cdot y) = hb(2 \cdot x-1, 2 \cdot y-1)$$

$$hb(2 \cdot x, 2 \cdot y) = hb(2 \cdot x, 2 \cdot y-1) \quad \text{[Formulae 20]}$$

(x=1, 2, ..., m, y=1, 2, ..., n)

In the case where the absolute value of Dsr(x, y) is the largest, the synthesized image hr having red color information is produced using (Formulae 21).

$$hr(2 \cdot x-1, 2 \cdot y-1) = a(x,y) \cdot LPF\_c\_rg(x,y)$$

$$hr(2 \cdot x, 2 \cdot y-1) = b(x,y)$$

$$hr(2 \cdot x-1, 2 \cdot y) = hr(2 \cdot x, 2 \cdot y-1)$$

$$hr(2 \cdot x, 2 \cdot y) = hr(2 \cdot x+1, 2 \cdot y-1) \quad \text{[Formulae 21]}$$

(x=1, 2, ..., m, y=1, 2, ..., n)

The synthesized image hg having green color information is produced using (Formulae 22).

$$hg(2 \cdot x-1, 2 \cdot y-1) = a(x,y)$$

$$hg(2 \cdot x, 2 \cdot y-1) = b(x,y)/LPF\_c\_rg(x,y)$$

$$hg(2 \cdot x-1, 2 \cdot y) = hg(2 \cdot x, 2 \cdot y-1)$$

$$hg(2 \cdot x, 2 \cdot y) = hg(2 \cdot x+1, 2 \cdot y-1) \quad \text{[Formulae 22]}$$

(x=1, 2, ..., m, y=1, 2, ..., n)

The synthesized image hb having blue color information is produced using (Formulae 23).

$$hb(2 \cdot x-1, 2 \cdot y-1) = a(x,y) \cdot LPF\_c\_bg(x,y)$$

$$hb(2 \cdot x, 2 \cdot y-1) = b(x,y) \cdot LPF\_c\_br(x,y)$$

$$hb(2 \cdot x-1, 2 \cdot y) = hb(2 \cdot x, 2 \cdot y-1)$$

$$hb(2 \cdot x, 2 \cdot y) = hb(2 \cdot x+1, 2 \cdot y-1) \quad \text{[Formulae 23]}$$

(x=1, 2, ..., m, y=1, 2, ..., n)

In the case where the absolute value of Dsl(x, y) is the largest, the synthesized image hr having red color information is produced using (Formulae 24).

$$hr(2 \cdot x-1, 2 \cdot y-1) = a(x,y) \cdot LPF\_c\_rg(x,y)$$

$$hr(2 \cdot x, 2 \cdot y-1) = b(x,y)$$

$$hr(2 \cdot x-1, 2 \cdot y) = hr(2 \cdot x-2, 2 \cdot y-1)$$

$$hr(2 \cdot x, 2 \cdot y) = hr(2 \cdot x-1, 2 \cdot y-1) \quad \text{[Formulae 24]}$$

(x=1, 2, ..., m, y=1, 2, ..., n)

The synthesized image hg having green color information is produced using (Formulae 25).

$$hg(2 \cdot x-1, 2 \cdot y-1) = a(x,y)$$

$$hg(2 \cdot x, 2 \cdot y-1) = b(x,y)/LPF\_c\_rg(x,y)$$

$$hg(2 \cdot x-1, 2 \cdot y) = hg(2 \cdot x-2, 2 \cdot y-1)$$

$$hg(2 \cdot x, 2 \cdot y) = hg(2 \cdot x-1, 2 \cdot y-1) \quad \text{[Formulae 25]}$$

(x=1, 2, ..., m, y=1, 2, ..., n)

The synthesized image hb having blue color information is produced using (Formulae 26).

$$hb(2 \cdot x-1, 2 \cdot y-1) = a(x,y) \cdot LPF\_c\_bg(x,y)$$

$$hb(2 \cdot x, 2 \cdot y-1) = b(x,y) \cdot LPF\_c\_br(x,y)$$

$$hb(2 \cdot x-1, 2 \cdot y) = hb(2 \cdot x-2, 2 \cdot y-1)$$

$$hb(2 \cdot x, 2 \cdot y) = hb(2 \cdot x-1, 2 \cdot y-1) \quad \text{[Formulae 26]}$$

(x=1, 2, ..., m, y=1, 2, ..., n)

Figure 10D:
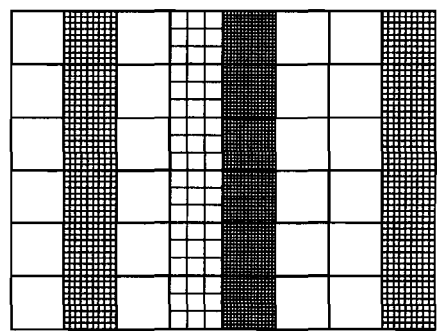
FIG. 10D is a view showing a high-resolution color synthesized image obtained by performing image synthesis in accordance with the direction of an edge of an image in an imaging device according to an embodiment of the present invention.

Since the subject image in FIG. 10A has the edge extending in the Y-axis direction, the synthesized images hr, hg, and hb are produced using (Formulae 18) to (Formulae 20). By synthesizing the calculated synthesized images hr, hg, and hb of red, green, and blue, the color irregularity caused in the image in FIG. 10C is removed as shown in FIG. 10D, resulting in a high-resolution color image h_rgb with 2·m×2·n pixels without color irregularity. In FIG. 10D, shading is expressed by the density of lines such that a darker color is expressed by a higher line density and a lighter color is expressed by a lower line density.

The following is the reason why the image with reduced color irregularity as shown in FIG. 10D can be obtained. In a local region having the edge extending in the Y-axis direction as shown in FIG. 10A, there is a high correlation between the brightness values of adjacent pixels in the Y-axis direction. Thus, even when the brightness values of adjacent pixels in the Y-axis direction are made equal, this has little influence on an output image. Consequently, as shown in (Formulae 18) to (Formulae 20), the same value is substituted into adjacent pixels in the Y-axis direction. This reproduces the linearity of the image of the edge extending in the Y-axis direction, resulting in the image without color irregularity as shown in FIG. 10D.

Although not shown in the figures, in a local region having the edge extending in the X-axis direction, there is a high correlation between the brightness values of adjacent pixels in the X-axis direction. Thus, even when the brightness values of adjacent pixels in the X-axis direction are made equal, this has little influence on an output image. Consequently, as shown in (Formulae 15) to (Formulae 17), the same value is substituted into adjacent pixels in the X-axis direction. This reproduces the linearity of the image of the edge extending in the X-axis direction, resulting in an image without color irregularity.

Although not shown in the figures, in a local region having the edge extending in the upper right oblique direction, there is a high correlation between the brightness values of adjacent pixels in the upper right oblique direction. Thus, even when the brightness values of adjacent pixels in the upper right oblique direction are made equal, this has little influence on an output image. Consequently, as shown in (Formulae 21) to (Formulae 23), the same value is substituted into adjacent pixels in the upper right oblique direction. This reproduces the linearity of the image of the edge extending in the upper right oblique direction, resulting in an image without color irregularity.

Although not shown in the figures, in a local region having the edge extending in the upper left oblique direction, there is a high correlation between the brightness values of adjacent pixels in the upper left oblique direction. Thus, even when the brightness values of adjacent pixels in the upper left oblique direction are made equal, this has little influence on an output image. Consequently, as shown in (Formulae 24) to (Formulae 26), the same value is substituted into adjacent pixels in the upper left oblique direction. This reproduces the linearity of the image of the edge extending in the upper left oblique direction, resulting in an image without color irregularity.

Considering the fact that the subject images formed on the imaging device 103 are reversed by the lenses 102a to 102d, the pixel arrangement of the color synthesized image h_rgb is reversed in the Y-axis direction as shown in FIG. 8. The upper right oblique direction and the upper left oblique direction as described above each refer to directions in the image after the reversal.

According to the above-described compound-eye imaging device of the present embodiment, it always is possible to output a high-resolution color image with less color irregularity regardless of the subject distance, even in the case where the shifting amounts between the four subject images projected respectively by the four single lenses deviate from an ideal shifting amount of 0.5 pixels.

Figure 11:
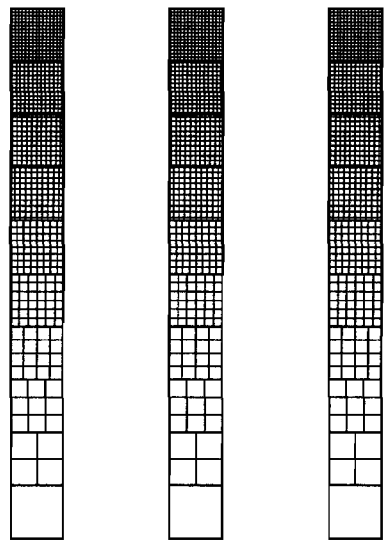
FIG. 11 is a view showing a subject with varying shading.

Further, as shown in FIG. 11, for example, in the case of a subject with varying shading, it is preferable that (Formulae 15) to (Formulae 26) are altered to (Formulae 27) to (Formulae 38) below including interpolation formulae. In this way, it always is possible to output a high-resolution color image with less color irregularity regardless of the subject distance and to express varying shading smoothly even in the case where the shifting amounts between the four subject images projected respectively by the four single lenses deviate from an ideal shifting amount of 0.5 pixels. In FIG. 11, shading is expressed by the density of lines such that a darker color is expressed by a higher line density and a lighter color is expressed by a lower line density.

In (Formulae 15) to (Formulae 26), as the brightness value of a pixel of the synthesized images hr, hg, and hb, the brightness value of a pixel located on one adjacent side of that pixel in the edge direction is substituted. In (Formulae 27) to (Formulae 38), on the other hand, a value obtained by subjecting the brightness values of two pixels located on both adjacent sides of that pixel in the edge direction to linear interpolation is substituted. It should be noted that the interpolation method is not limited to linear interpolation, and it is also possible to employ cubic interpolation using the brightness values of two pixels located on both adjacent sides, or the like.

In the case where the absolute value of Dx(x, y) is the largest among the absolute values of calculated Dx(x, y), Dy(x, y), Dsr(x, y), and Dsl(x, y), the synthesized images hr, hg, and hb are produced using (Formulae 27), (Formulae 28), and (Formulae 29), respectively.

[Formulae 27]
$$hr(2 \cdot x - 1, 2 \cdot y - 1) = a(x, y) \cdot LPF\_c\_rg(x, y)$$
$$hr(2 \cdot x, 2 \cdot y - 1) = 0.5 \cdot \left( \begin{array}{c} hr(2 \cdot x - 1, 2 \cdot y - 1) + \\ hr(2 \cdot x + 1, 2 \cdot y - 1) \end{array} \right)$$
$$hr(2 \cdot x - 1, 2 \cdot y) = \frac{c(x, y)}{LPF\_c\_br(x, y)}$$
$$hr(2 \cdot x, 2 \cdot y) = 0.5 \cdot \left( \begin{array}{c} hr(2 \cdot x - 1, 2 \cdot y) + \\ hr(2 \cdot x + 1, 2 \cdot y) \end{array} \right)$$
$$(x = 1, 2, \ldots, m, y = 1, 2, \ldots, n)$$

[Formulae 28]
$$hg(2 \cdot x - 1, 2 \cdot y - 1) = a(x, y)$$
$$hg(2 \cdot x, 2 \cdot y - 1) = 0.5 \cdot \left( \begin{array}{c} hg(2 \cdot x - 1, 2 \cdot y - 1) + \\ hg(2 \cdot x + 1, 2 \cdot y - 1) \end{array} \right)$$
$$hg(2 \cdot x - 1, 2 \cdot y) = \frac{c(x, y)}{LPF\_c\_bg(x, y)}$$
$$hg(2 \cdot x, 2 \cdot y) = 0.5 \cdot \left( \begin{array}{c} hg(2 \cdot x - 1, 2 \cdot y) + \\ hg(2 \cdot x + 1, 2 \cdot y) \end{array} \right)$$
$$(x = 1, 2, \ldots, m, y = 1, 2, \ldots, n)$$

[Formulae 29]
$$hb(2 \cdot x - 1, 2 \cdot y - 1) = a(x, y) \cdot LPF\_c\_bg(x, y)$$
$$hb(2 \cdot x, 2 \cdot y - 1) = 0.5 \cdot \left( \begin{array}{c} hb(2 \cdot x - 1, 2 \cdot y - 1) + \\ hb(2 \cdot x + 1, 2 \cdot y - 1) \end{array} \right)$$
$$hb(2 \cdot x - 1, 2 \cdot y) = c(x, y)$$
$$hb(2 \cdot x, 2 \cdot y) = 0.5 \cdot \left( \begin{array}{c} hb(2 \cdot x - 1, 2 \cdot y) + \\ hb(2 \cdot x + 1, 2 \cdot y) \end{array} \right)$$
$$(x = 1, 2, \ldots, m, y = 1, 2, \ldots, n)$$

In the case where the absolute value of Dy(x, y) is the largest, the synthesized images hr, hg, and hb are produced using (Formulae 30), (Formulae 31), and (Formulae 32), respectively.

[Formulae 30]
$$hr(2 \cdot x - 1, 2 \cdot y - 1) = a(x, y) \cdot LPF\_c\_rg(x, y)$$
$$hr(2 \cdot x, 2 \cdot y - 1) = b(x, y)$$
$$hr(2 \cdot x - 1, 2 \cdot y) = 0.5 \cdot \left( \begin{array}{c} hr(2 \cdot x - 1, 2 \cdot y - 1) + \\ hr(2 \cdot x - 1, 2 \cdot y - 1) \end{array} \right)$$
$$hr(2 \cdot x, 2 \cdot y) = 0.5 \cdot \left( \begin{array}{c} hr(2 \cdot x, 2 \cdot y - 1) + \\ hr(2 \cdot x, 2 \cdot y + 1) \end{array} \right)$$
$$(x = 1, 2, \ldots, m, y = 1, 2, \ldots, n)$$

[Formulae 31]
$$hg(2 \cdot x - 1, 2 \cdot y - 1) = a(x, y)$$
$$hg(2 \cdot x, 2 \cdot y - 1) = \frac{b(x, y)}{LPF\_c\_rg(x, y)}$$
$$hg(2 \cdot x - 1, 2 \cdot y) = 0.5 \cdot \left( \begin{array}{c} hg(2 \cdot x - 1, 2 \cdot y - 1) + \\ hg(2 \cdot x - 1, 2 \cdot y + 1) \end{array} \right)$$
$$hg(2 \cdot x, 2 \cdot y) = 0.5 \cdot \left( \begin{array}{c} hg(2 \cdot x, 2 \cdot y - 1) + \\ hg(2 \cdot x, 2 \cdot y + 1) \end{array} \right)$$
$$(x = 1, 2, \ldots, m, y = 1, 2, \ldots, n)$$

[Formulae 32]
$$hb(2 \cdot x - 1, 2 \cdot y - 1) = a(x, y) \cdot LPF\_c\_bg(x, y)$$
$$hb(2 \cdot x, 2 \cdot y - 1) = b(x, y) \cdot LPF\_c\_br(x, y)$$
$$hb(2 \cdot x - 1, 2 \cdot y) = 0.5 \cdot \left( \begin{array}{c} hb(2 \cdot x - 1, 2 \cdot y - 1) + \\ hb(2 \cdot x - 1, 2 \cdot y + 1) \end{array} \right)$$
$$hb(2 \cdot x, 2 \cdot y) = 0.5 \cdot \left( \begin{array}{c} hb(2 \cdot x, 2 \cdot y - 1) + \\ hb(2 \cdot x, 2 \cdot y + 1) \end{array} \right)$$
$$(x = 1, 2, \ldots, m, y = 1, 2, \ldots, n)$$

In the case where the absolute value of Dsr(x, y) is the largest, the synthesized images hr, hg, and hb are produced using (Formulae 33), (Formulae 34), and (Formulae 35), respectively.

$$hr(2 \cdot x - 1, 2 \cdot y - 1) = a(x, y) \cdot LPF\_c\_rg(x, y) \quad \text{[Formulae 33]}$$
$$hr(2 \cdot x, 2 \cdot y - 1) = b(x, y)$$
$$hr(2 \cdot x - 1, 2 \cdot y) = 0.5 \cdot \begin{pmatrix} hr(2 \cdot x, 2 \cdot y - 1) + \\ hr(2 \cdot x - 2, 2 \cdot y + 1) \end{pmatrix}$$
$$hr(2 \cdot x, 2 \cdot y) = 0.5 \cdot \begin{pmatrix} hr(2 \cdot x + 1, 2 \cdot y - 1) + \\ hr(2 \cdot x - 1, 2 \cdot y + 1) \end{pmatrix}$$
$$(x = 1, 2, \ldots, m, y = 1, 2, \ldots, n)$$

$$hg(2 \cdot x - 1, 2 \cdot y - 1) = a(x, y) \quad \text{[Formulae 34]}$$
$$hg(2 \cdot x, 2 \cdot y - 1) = \frac{b(x, y)}{LPF\_c\_rg(x, y)}$$
$$hg(2 \cdot x - 1, 2 \cdot y) = 0.5 \cdot \begin{pmatrix} hg(2 \cdot x, 2 \cdot y - 1) + \\ hg(2 \cdot x - 2, 2 \cdot y + 1) \end{pmatrix}$$
$$hg(2 \cdot x, 2 \cdot y) = 0.5 \cdot \begin{pmatrix} hg(2 \cdot x + 1, 2 \cdot y - 1) + \\ hg(2 \cdot x - 1, 2 \cdot y + 1) \end{pmatrix}$$
$$(x = 1, 2, \ldots, m, y = 1, 2, \ldots, n)$$

$$hb(2 \cdot x - 1, 2 \cdot y - 1) = a(x, y) \cdot LPF\_c\_bg(x, y) \quad \text{[Formulae 35]}$$
$$hb(2 \cdot x, 2 \cdot y - 1) = b(x, y) \cdot LPF\_c\_br(x, y)$$
$$hb(2 \cdot x - 1, 2 \cdot y) = 0.5 \cdot \begin{pmatrix} hb(2 \cdot x, 2 \cdot y - 1) + \\ hb(2 \cdot x - 2, 2 \cdot y + 1) \end{pmatrix}$$
$$hb(2 \cdot x, 2 \cdot y) = 0.5 \cdot \begin{pmatrix} hb(2 \cdot x + 1, 2 \cdot y - 1) + \\ hb(2 \cdot x - 1, 2 \cdot y + 1) \end{pmatrix}$$
$$(x = 1, 2, \ldots, m, y = 1, 2, \ldots, n)$$

In the case where the absolute value of Dsl(x, y) is the largest, the synthesized images hr, hg, and hb are produced using (Formulae 36), (Formulae 37), and (Formulae 38), respectively.

$$hr(2 \cdot x - 1, 2 \cdot y - 1) = a(x, y) \cdot LPF\_c\_rg(x, y) \quad \text{[Formulae 36]}$$
$$hr(2 \cdot x, 2 \cdot y - 1) = b(x, y)$$
$$hr(2 \cdot x - 1, 2 \cdot y) = 0.5 \cdot \begin{pmatrix} hr(2 \cdot x - 2, 2 \cdot y - 1) + \\ hr(2 \cdot x, 2 \cdot y + 1) \end{pmatrix}$$
$$hr(2 \cdot x, 2 \cdot y) = 0.5 \cdot \begin{pmatrix} hr(2 \cdot x - 1, 2 \cdot y - 1) + \\ hr(2 \cdot x + 1, 2 \cdot y + 1) \end{pmatrix}$$
$$(x = 1, 2, \ldots, m, y = 1, 2, \ldots, n)$$

$$hg(2 \cdot x - 1, 2 \cdot y - 1) = a(x, y) \quad \text{[Formulae 37]}$$
$$hg(2 \cdot x, 2 \cdot y - 1) = \frac{b(x, y)}{LPF\_c\_rg(x, y)}$$
$$hg(2 \cdot x - 1, 2 \cdot y) = 0.5 \cdot \begin{pmatrix} hg(2 \cdot x - 2, 2 \cdot y - 1) + \\ hg(2 \cdot x, 2 \cdot y + 1) \end{pmatrix}$$
$$hg(2 \cdot x, 2 \cdot y) = 0.5 \cdot \begin{pmatrix} hg(2 \cdot x - 1, 2 \cdot y - 1) + \\ hg(2 \cdot x + 1, 2 \cdot y + 1) \end{pmatrix}$$
$$(x = 1, 2, \ldots, m, y = 1, 2, \ldots, n)$$

$$hb(2 \cdot x - 1, 2 \cdot y - 1) = a(x, y) \cdot LPF\_c\_bg(x, y) \quad \text{[Formulae 38]}$$
$$hb(2 \cdot x, 2 \cdot y - 1) = b(x, y) \cdot LPF\_c\_br(x, y)$$
$$hb(2 \cdot x - 1, 2 \cdot y) = 0.5 \cdot \begin{pmatrix} hb(2 \cdot x - 2, 2 \cdot y - 1) + \\ hb(2 \cdot x, 2 \cdot y + 1) \end{pmatrix}$$
$$hb(2 \cdot x, 2 \cdot y) = 0.5 \cdot \begin{pmatrix} hb(2 \cdot x - 1, 2 \cdot y - 1) + \\ hb(2 \cdot x + 1, 2 \cdot y + 1) \end{pmatrix}$$

Depending on the subject distance, the pixel d(x, y) in the imaging region 104d sometimes receives the subject image 114 that is shifted with respect to the pixel a(x, y) in the imaging region 104a by about 0.5 pixels in the positive direction of the X axis and by about 0.5 pixels in the positive direction of the Y axis. In such a case, it is preferable to use (Formulae 39) to (Formulae 44) instead of (Formulae 27) to (Formulae 32). In this way, at a specific subject distance, it is possible to improve the color reproduction of green, making it possible to obtain higher-resolution brightness information, and therefore a visually higher-resolution image can be achieved.

In the case where the absolute value of Dx(x, y) is the largest among the absolute values of calculated Dx(x, y), Dy(x, y), Dsr(x, y), and Dsl(x, y), the synthesized images hr, hg, and hb are produced using (Formulae 39), (Formulae 40), and (Formulae 41), respectively.

$$hr(2 \cdot x - 1, 2 \cdot y - 1) = a(x, y) \cdot LPF\_c\_rg(x, y) \quad \text{[Formulae 39]}$$
$$hr(2 \cdot x, 2 \cdot y - 1) = 0.5 \cdot \begin{pmatrix} hr(2 \cdot x - 1, 2 \cdot y - 1) + \\ hr(2 \cdot x + 1, 2 \cdot y - 1) \end{pmatrix}$$
$$hr(2 \cdot x - 1, 2 \cdot y) = 0.5 \cdot \begin{pmatrix} hr(2 \cdot x, 2 \cdot y) + \\ hr(2 \cdot x - 2, 2 \cdot y) \end{pmatrix}$$
$$hr(2 \cdot x, 2 \cdot y) = d(x, y) \cdot LPF\_c\_rg(x, y)$$
$$(x = 1, 2, \ldots, m, y = 1, 2, \ldots, n)$$

$$hg(2 \cdot x - 1, 2 \cdot y - 1) = a(x, y) \quad \text{[Formulae 40]}$$
$$hg(2 \cdot x, 2 \cdot y - 1) = 0.5 \cdot \begin{pmatrix} hg(2 \cdot x - 1, 2 \cdot y - 1) + \\ hg(2 \cdot x + 1, 2 \cdot y - 1) \end{pmatrix}$$
$$hg(2 \cdot x - 1, 2 \cdot y) = 0.5 \cdot \begin{pmatrix} hg(2 \cdot x, 2 \cdot y) + \\ hg(2 \cdot x - 2, 2 \cdot y) \end{pmatrix}$$
$$hg(2 \cdot x, 2 \cdot y) = d(x, y)$$
$$(x = 1, 2, \ldots, m, y = 1, 2, \ldots, n)$$

$$hb(2 \cdot x - 1, 2 \cdot y - 1) = a(x, y) \cdot LPF\_c\_bg(x, y) \quad \text{[Formulae 41]}$$
$$hb(2 \cdot x, 2 \cdot y - 1) = 0.5 \cdot \begin{pmatrix} hb(2 \cdot x - 1, 2 \cdot y - 1) + \\ hb(2 \cdot x + 1, 2 \cdot y - 1) \end{pmatrix}$$
$$hb(2 \cdot x - 1, 2 \cdot y) = 0.5 \cdot \begin{pmatrix} hb(2 \cdot x, 2 \cdot y) + \\ hb(2 \cdot x - 2, 2 \cdot y) \end{pmatrix}$$
$$hb(2 \cdot x, 2 \cdot y) = d(x, y) \cdot LPF\_c\_bg(x, y)$$
$$(x = 1, 2, \ldots, m, y = 1, 2, \ldots, n)$$

In the case where the absolute value of Dy(x, y) is the largest, the synthesized images hr, hg, and hb are produced using (Formulae 42), (Formulae 43), and (Formulae 44), respectively.

$$hr(2 \cdot x - 1, 2 \cdot y - 1) = a(x, y) \cdot LPF\_c\_rg(x, y) \quad \text{[Formulae 42]}$$
$$hr(2 \cdot x, 2 \cdot y - 1) = 0.5 \cdot \begin{pmatrix} hr(2 \cdot x, 2 \cdot y) + \\ hr(2 \cdot x, 2 \cdot y - 2) \end{pmatrix}$$
$$hr(2 \cdot x - 1, 2 \cdot y) = 0.5 \cdot \begin{pmatrix} hr(2 \cdot x - 1, 2 \cdot y - 1) + \\ hr(2 \cdot x - 1, 2 \cdot y + 1) \end{pmatrix}$$
$$hr(2 \cdot x, 2 \cdot y) = d(x, y) \cdot LPF\_c\_rg(x, y)$$
$$(x = 1, 2, \ldots, m, y = 1, 2, \ldots, n)$$

$$hg(2 \cdot x - 1, 2 \cdot y - 1) = a(x, y) \quad \text{[Formulae 43]}$$
$$hg(2 \cdot x, 2 \cdot y - 1) = 0.5 \cdot \begin{pmatrix} hg(2 \cdot x, 2 \cdot y) + \\ hg(2 \cdot x, 2 \cdot y - 2) \end{pmatrix}$$
$$hg(2 \cdot x - 1, 2 \cdot y) = 0.5 \cdot \begin{pmatrix} hg(2 \cdot x - 1, 2 \cdot y - 1) + \\ hg(2 \cdot x - 1, 2 \cdot y + 1) \end{pmatrix}$$
$$hg(2 \cdot x, 2 \cdot y) = d(x, y)$$
$$(x = 1, 2, \ldots, m, y = 1, 2, \ldots, n)$$

-continued $$hb(2 \cdot x - 1, 2 \cdot y - 1) = a(x, y) \cdot LPF\_c\_bg(x, y)$$ [Formulae 44]

$$hb(2 \cdot x, 2 \cdot y - 1) = 0.5 \cdot \begin{pmatrix} hb(2 \cdot x, 2 \cdot y) + \\ hb(2 \cdot x, 2 \cdot y - 2) \end{pmatrix}$$

$$hb(2 \cdot x - 1, 2 \cdot y) = 0.5 \cdot \begin{pmatrix} hb(2 \cdot x - 1, 2 \cdot y - 1) + \\ hb(2 \cdot x - 1, 2 \cdot y + 1) \end{pmatrix}$$

$$hb(2 \cdot x, 2 \cdot y) = a(x, y) \cdot LPF\_c\_bg(x, y)$$

$$(x = 1, 2, \ldots, m, y = 1, 2, \ldots, n)$$

In the case of a subject including a curve, the curve sometimes is not smooth in the synthesized color image h_rgb. In addition, color irregularity sometimes occurs due to the image synthesis method utilizing the correlation between pieces of image information of respective colors in a local region. In such a case, it is preferable to synthesize the color image h_rgb from synthesized images EDGE_hr. EDGE_hg, and EDGE_hb obtained by subjecting the synthesized images hr, hg, and hb to a weighted smoothing filter as shown in (Formulae 45) and an edge enhancement filter as shown in (Formulae 46). In this way, it always is possible to output a high-resolution color image with less color irregularity regardless of the subject distance even in the case where the shifting amounts between the four subject images projected respectively by the four single lenses deviate from an ideal shifting amount of 0.5 pixels. Further, it is possible to express varying shading smoothly, to express, even in the case of a subject including a curve, the curve as a smooth curve, and to reduce color irregularity caused due to the image synthesis method utilizing the correlation between pieces of image information of respective colors in a local region.

$$LPF\_hr(x, y) =$$ [Formulae 45]
$$(hr(x - 1, y - 1) + 2 \cdot hr(x, y - 1) + hr(x + 1, y - 1) +$$
$$2 \cdot hr(x - 1, y) + 4 \cdot hr(x, y) +$$
$$2 \cdot hr(x + 1, y) + hr(x - 1, y + 1) +$$
$$2 \cdot hr(x, y + 1) + hr(x + 1, y + 1))/16$$
$$LPF\_hg(x, y) = (hg(x - 1, y - 1) + 2 \cdot hg(x, y - 1) +$$
$$hg(x + 1, y - 1) + 2 \cdot hg(x - 1, y) +$$
$$4 \cdot hg(x, y) + 2 \cdot hg(x + 1, y) + hg(x - 1, y + 1) +$$
$$2 \cdot hg(x, y + 1) + hg(x + 1, y + 1))/16$$
$$LPF\_hb(x, y) = (hb(x - 1, y - 1) + 2 \cdot hb(x, y - 1) +$$
$$hb(x + 1, y - 1) + 2 \cdot hb(x - 1, y) +$$
$$4 \cdot hb(x, y) + 2 \cdot hb(x + 1, y) + hb(x - 1, y + 1) +$$
$$2 \cdot hb(x, y + 1) + hb(x + 1, y + 1))/16$$
$$(x = 1, 2, \ldots, 2 \cdot m, y = 1, 2, \ldots, 2 \cdot n)$$

$$EDGE\_hr(x, y) =$$ [Formulae 46]
$$-hr(x - 1, y - 1) - hr(x, y - 1) - hr(x + 1, y - 1) -$$
$$hr(x - 1, y) + 5 \cdot hr(x, y) - hr(x + 1, y) -$$
$$hr(x - 1, y + 1) - hr(x, y + 1) - hr(x + 1, y + 1)$$
$$EDGE\_hg(x, y) = -hg(x - 1, y - 1) - hg(x, y - 1) -$$
$$hg(x + 1, y - 1) - hg(x - 1, y) +$$
$$5 \cdot hg(x, y) - hg(x + 1, y) - hg(x - 1, y + 1) -$$
$$hg(x, y + 1) - hg(x + 1, y + 1)$$
$$EDGE\_hb(x, y) = -hb(x - 1, y - 1) - hb(x, y - 1) -$$
$$hb(x + 1, y - 1) - hb(x - 1, y) +$$
$$5 \cdot hb(x, y) - hb(x + 1, y) - hb(x - 1, y + 1) -$$
$$hb(x, y + 1) - hb(x + 1, y + 1)$$
$$(x = 1, 2, \ldots, 2 \cdot m, y = 1, 2, \ldots, 2 \cdot n)$$

At an end of an image, the calculation of the weighted smoothing filter or the like sometimes is impossible. In such a case, appropriate handling is performed such as preventing the use of that filter.

Figure 12:
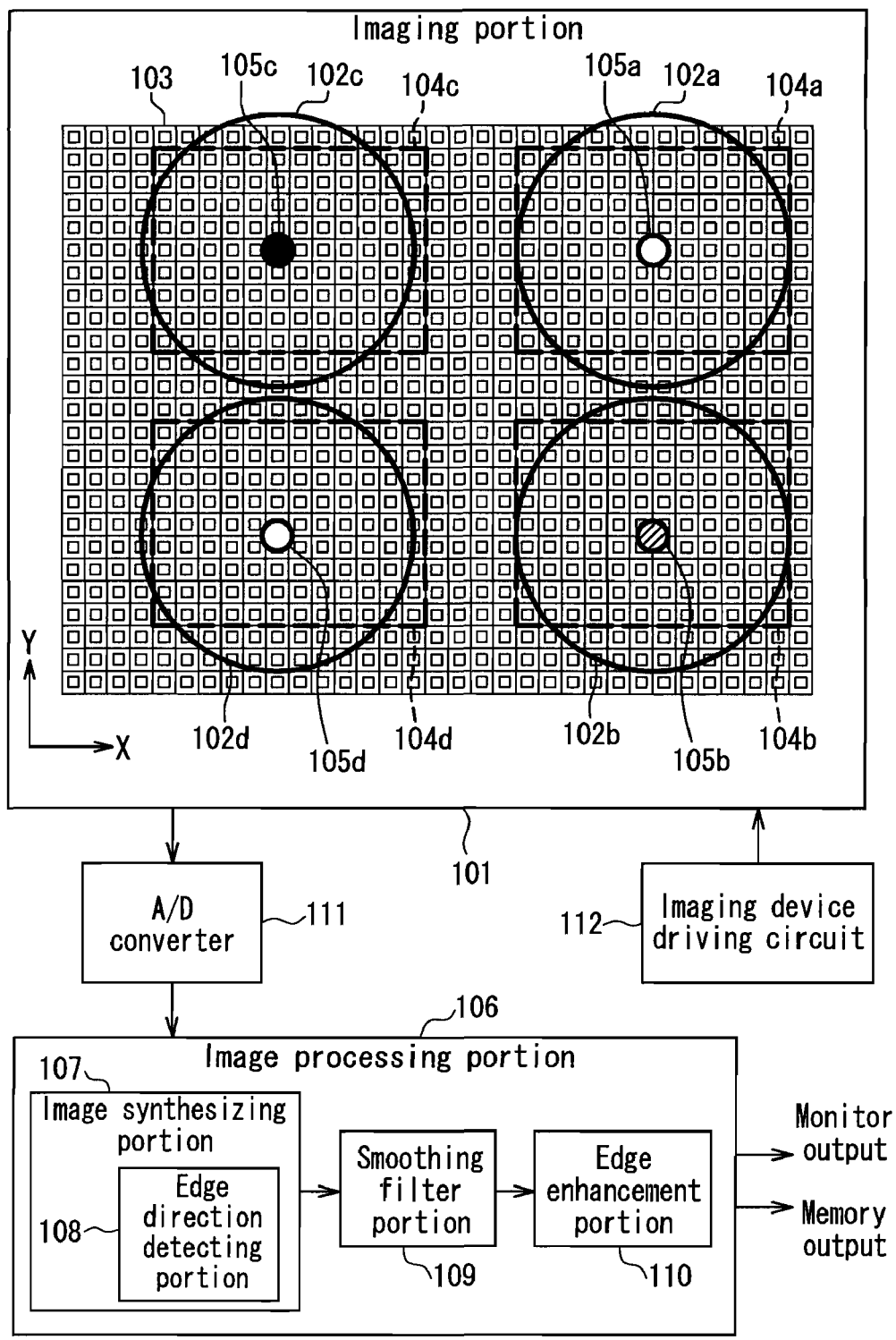
FIG. 12 is a view showing a schematic configuration of an imaging device according to another embodiment of the present invention in which a subject distance does not vary.

In the case where the subject distance is substantially equal to an infinite distance, and as shown in FIG. 12, the position of the optical axis 105c in the imaging region 104c is shifted with respect to the position of the optical axis 105a in the imaging region 104a by about 0.5 pixels in the X-axis direction and the position of the optical axis 105b in the imaging region 104b is shifted with respect to the position of the optical axis 105a in the imaging region 104a by about 0.5 pixels in the Y-axis direction, it is possible to change the method for synthesizing the synthesized images hr, hg, and hb in accordance with the edge direction of the subject, and to use a weighted smoothing filter and an edge enhancement filter based on the concept similar to the above. In this way, it always is possible to output a high-resolution color image with less color irregularity even in the case where the shifting amounts between the four subject images projected respectively by the four single lenses deviate from an ideal shifting amount of 0.5 pixels. Further, it is possible to express varying shading smoothly, to express, even in the case of a subject including a curve, the curve as a smooth curve, and to reduce color irregularity caused due to the image synthesis method utilizing the correlation between pieces of image information of respective colors in a local region.

Further, in the case where the position of the subject image on the imaging region 104c is shifted with respect to the position of the subject image on the imaging region 104a by about 0.5 pixels in the X-axis direction and the position of the subject image on the imaging region 104b is shifted with respect to the position of the subject image on the imaging region 104a by about 0.5 pixels in the Y-axis direction due to parallaxes, it is possible to change the method for synthesizing the synthesized images hr, hg, and hb in accordance with the edge direction of the subject, and to use a weighted smoothing filter and an edge enhancement filter based on the concept similar to the above. In this way, it always is possible to output a high-resolution color image with less color irregularity even in the case where the shifting amounts between the four subject images projected respectively by the four single lenses deviate from an ideal shifting amount of 0.5 pixels. Further, it is possible to express varying shading smoothly, to express, even in the case of a subject including a curve, the curve as a smooth curve, and to reduce color irregularity caused due to the image synthesis method utilizing the correlation between pieces of image information of respective colors in a local region.

In the case where the four lenses 102a to 102d in FIG. 1 are formed integrally on a lens array, the positions of the optical axes 105a to 105d of the lenses move due to a temperature variation. However, since the lens array expands and contracts isotropically, the direction along which the positions of the optical axes 105a to 105d of the lenses move is the same as the direction along which the subject image moves due to parallax when the subject distance varies. Thus, the influence of a temperature variation is absorbed by the parallax correction processing. Therefore, according to the present embodiment, it always is possible to output a high-resolution color image with less color irregularity even when the temperature varies. Further, it is possible to express varying shading smoothly, to express, even in the case of a subject including a curve, the curve as a smooth curve, and to reduce color irregularity caused due to the image synthesis method utilizing the correlation between pieces of image information of respective colors in a local region.

The above-described embodiments merely are examples, and the present invention is not limited thereto. For example, the image synthesis method utilizing the correlation between pieces of image information of different colors, the selection of the image synthesis method in accordance with the edge direction of the subject, the value of the weighting factor of the weighted smoothing filter and the edge enhancement filter, and the like are not limited to the above-described examples. Another method or value based on a similar concept also may be used, which can achieve the effect similar to the above.

In the imaging device in FIG. 1, in the case where the shifting amounts between the four subject images projected respectively by the four single lenses deviate from an ideal shifting amount of 0.5 pixels, an edge direction detecting portion 108 may be removed for the purpose of reducing the computation time and the memory amount, so that the synthesized images hr, hg, and hb of red, green, and blue are calculated using (Formulae 8) to (Formulae 10). In such a case, by subjecting the synthesized images hr, hg, and hb to a smoothing filter portion 109 and an edge enhancement portion 110 in FIG. 10, it is possible to reduce color irregularity due to the fact that the shifting amounts between the four subject images deviate from an ideal shifting amount of 0.5 pixels, whereby a high-resolution color image with less color irregularity always can be output even when the subject distance varies. Further, it is also possible to reduce color irregularity caused due to the image synthesis method utilizing the correlation between pieces of image information of respective colors in a local region.

In the imaging device of the present embodiment, the color filters 113a, 113b, 113c, and 113d may be removed. In such a case, by altering (Formulae 5) to (Formulae 47) below, it always is possible to output a high-resolution monochrome image without color irregularity regardless of the subject distance or a temperature variation even in the case where the shifting amounts between the four subject images projected respectively by the four single lenses deviate from an ideal shifting amount of 0.5 pixels. Further, it is possible to realize a thin imaging device for outputting a monochrome picture that can express varying shading smoothly and, even in the case of a subject including a curve, can express the curve as a smooth curve.

$$c\_rg(x,y)=1$$

$$c\_bg(x,y)=1$$

$$c\_rg(x,y)=1 \qquad \text{[Formulae 47]}$$

(x=1, 2, . . . , m, y=1, 2, . . . , n)

Figure 13A:
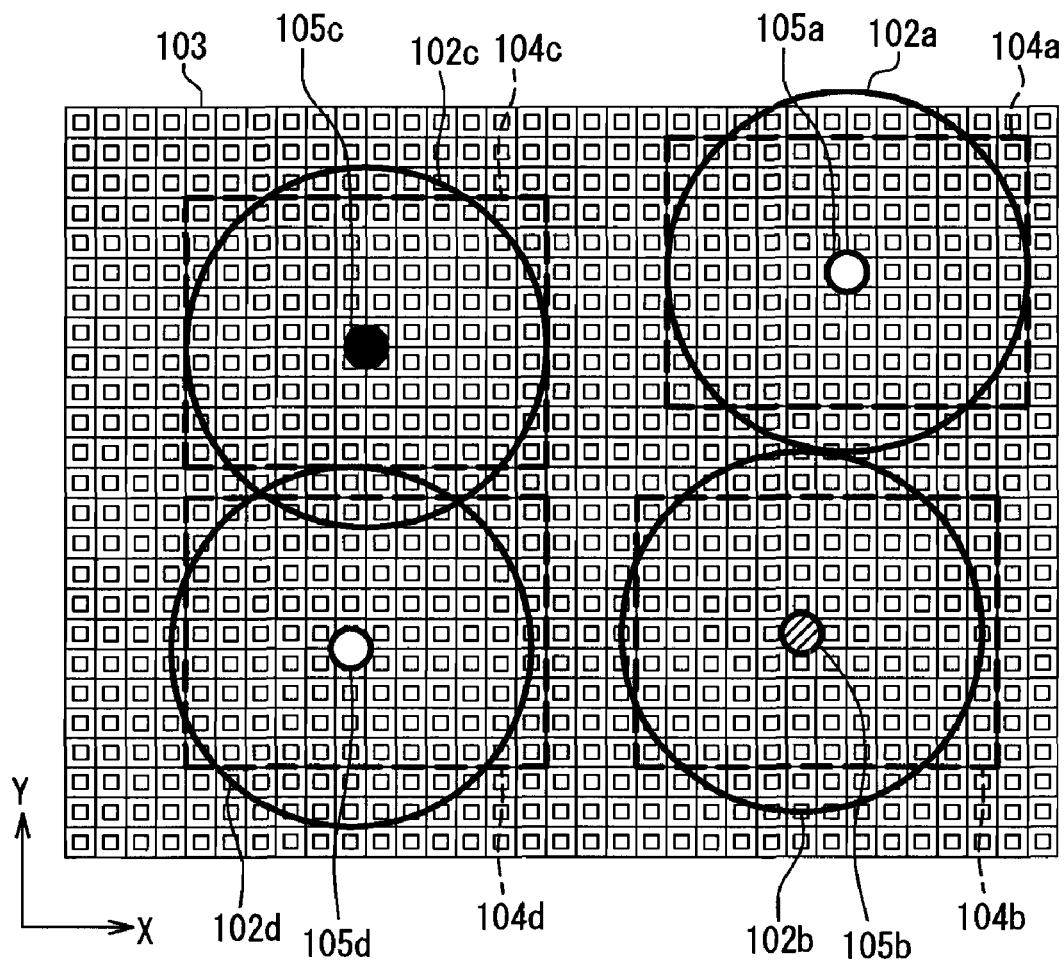
FIG. 13A is a view showing a schematic configuration of an imaging portion of an imaging device according to another embodiment of the present invention.

In the present embodiment, it is sufficient that the relative positional relationship of the optical axis 105c with respect to the imaging region 104c is shifted with respect to the relative positional relationship of the optical axis 105a with respect to the imaging region 104a by about 0.5 pixels (herein, "about 0.5 pixels" refers to a range from 0.25 pixels to 0.75 pixels as described below) in the Y-axis direction. FIG. 1 satisfies this condition. In FIG. 13A, although the optical axis 105c is shifted with respect to the optical axis 105a by 2.5 pixels in the Y-axis direction on the imaging device 103, the relative positional relationship of the optical axis 105c with respect to the imaging region 104c is shifted with respect to the relative positional relationship of the optical axis 105a with respect to the imaging region 104a by about 0.5 pixels in the Y-axis direction. Thus, the above-described condition is satisfied.

Figure 13B:
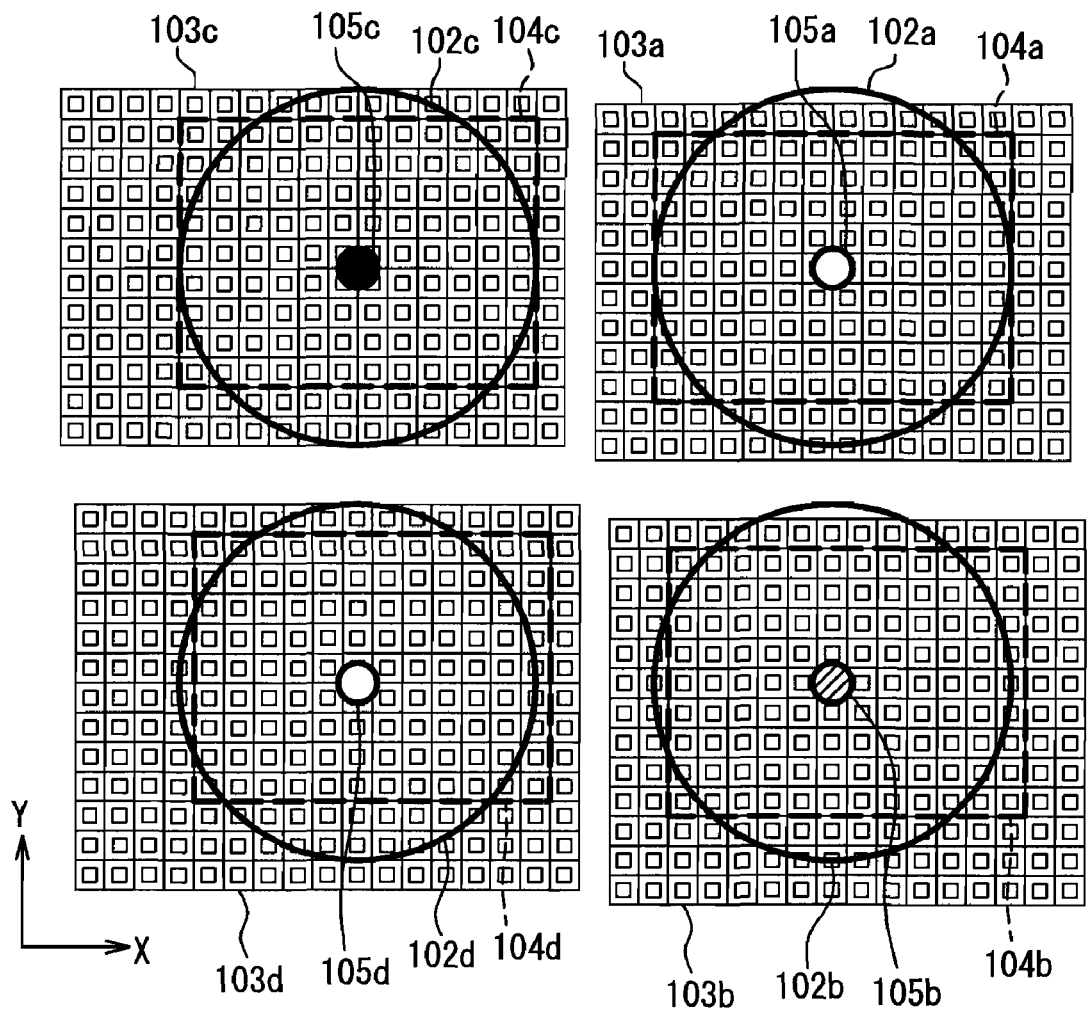
FIG. 13B is a view showing a schematic configuration of an imaging portion of an imaging device according to still another embodiment of the present invention.

The imaging regions 104a to 104d need not be formed on the common single imaging device 103 as shown in FIGS. 1 and 13A, and may be formed on four separate imaging devices 103a to 103d, respectively, as shown in FIG. 13B. However, among the imaging regions 104a to 104d, horizontal directions and vertical directions of the arrangement of the respective pixels in the imaging regions 104a to 104d have to be substantially equal to one another. Also in this case, it is sufficient that the above-described condition that the relative positional relationship of the optical axis 105c with respect to the imaging region 104c is shifted with respect to the relative positional relationship of the optical axis 105a with respect to the imaging region 104a by about 0.5 pixels in the Y-axis direction is satisfied.

However, even when the above-described condition is satisfied, an overly large shifting amount of the optical axis 105c with respect to the optical axis 105a in the Y-axis direction could lead to a problem in the case of a short subject distance (namely, close-distance imaging). This is because in the case of a short subject distance, the parallax in the Y-axis direction generated due to the shifting of the optical axis 105c with respect to the optical axis 105a in the Y-axis direction cannot be ignored. Thus, in the case where the lower limit of the subject distance is known, a shifting amount Gs of the optical axis 105c with respect to the optical axis 105a in the Y-axis direction preferably satisfies (Formula 48). Herein, A1 indicates the lower limit of the subject distance, f indicates the distance (composite focal length) between the single lenses 102a to 102d and the imaging device 103, and p indicates the pixel pitch of the imaging device 103.

Further, it is sufficient that the relative positional relationship of the optical axis 105b with respect to the imaging region 104b is shifted with respect to the relative positional relationship of the optical axis 105a with respect to the imaging region 104a by about 0.5 pixels (herein, "about 0.5 pixels" refers to a range from 0.25 pixels to 0.75 pixels as described below) in the X-axis direction. FIG. 1 satisfies this condition. In FIG. 13A, although the optical axis 105b is shifted with respect to the optical axis 105a by 1.5 pixels in the X-axis direction on the imaging device 103, the relative positional relationship of the optical axis 105b with respect to the imaging region 104b is shifted with respect to the relative positional relationship of the optical axis 105a with respect to the imaging region 104a by about 0.5 pixels in the X-axis direction. Thus, the above-described condition is satisfied.

The imaging regions 104a to 104d may be formed on the four separate imaging devices 103a to 103d, respectively, as shown in FIG. 13B. However, among the imaging regions 104a to 104d, horizontal directions and vertical directions of the arrangement of the respective pixels in the imaging regions 104a to 104d have to be substantially equal to one another. Also in this case, it is sufficient that the above-described condition that the relative positional relationship of the optical axis 105b with respect to the imaging region 104b is shifted with respect to the relative positional relationship of the optical axis 105a with respect to the imaging region 104a by about 0.5 pixels in the X-axis direction is satisfied.

However, even when the above-described condition is satisfied, an overly large shifting amount of the optical axis 105b with respect to the optical axis 105a in the X-axis direction could lead to a problem in the case of a short subject distance (namely, close-distance imaging). This is because in the case of a short subject distance, the parallax in the X-axis direction generated due to the shifting of the optical axis 105b with respect to the optical axis 105a in the X-axis direction cannot be ignored. Thus, in the case where the lower limit of the subject distance is known, a shifting amount Gs of the optical axis 10b with respect to the optical axis 105a in the X-axis direction preferably satisfies (Formula 48).

$$|Gs| \leq A1 \cdot p/(4 \cdot f) \qquad \text{[Formula 48]}$$

As long as (Formula 48) is satisfied, when the relative positional relationship of the optical axis 105c with respect to the imaging region 104c is shifted with respect to the relative positional relationship of the optical axis 105a with respect to the imaging region 104a by 0.5 pixels in the Y-axis direction, the shifting amount between the subject image on the imaging region 104c and the subject image on the imaging region 104a in the Y-axis direction is always 0.25 pixels or more and 0.75 pixels or less regardless of the subject distance.

Further, as long as (Formula 48) is satisfied, when the relative positional relationship of the optical axis 105b with respect to the imaging region 104b is shifted with respect to the relative positional relationship of the optical axis 105a with respect to the imaging region 104a by 0.5 pixels in the X-axis direction, the shifting amount between the subject image on the imaging region 104b and the subject image on the imaging region 104a in the X-axis direction is always 0.25 pixels or more and 0.75 pixels or less regardless of the subject distance.

Namely, as long as (Formula 48) is satisfied, a high-resolution color and monochrome image with less color irregularity always can be output even when the subject distance varies. Further, it is possible to express varying shading smoothly, to express, even in the case of a subject including a curve, the curve as a smooth curve, and to reduce color irregularity caused due to the image synthesis method utilizing the correlation between pieces of image information of respective colors in a local region.

In the present invention, although it is desirable that the lenses 102a to 102d are formed in the same plane, the imaging device of the present invention can be realized even when they are not formed strictly in the same plane due to forming errors or the like.

In the present invention, a high-resolution image can be obtained by image synthesis when the shifting amount of the position of the subject image between the imaging regions is about 0.5 pixels. Herein, "about 0.5 pixels" refers to 0.25 pixels or more and 0.75 pixels or less. This will be described with reference to FIGS. 14A to 14C.

Figure 14A:
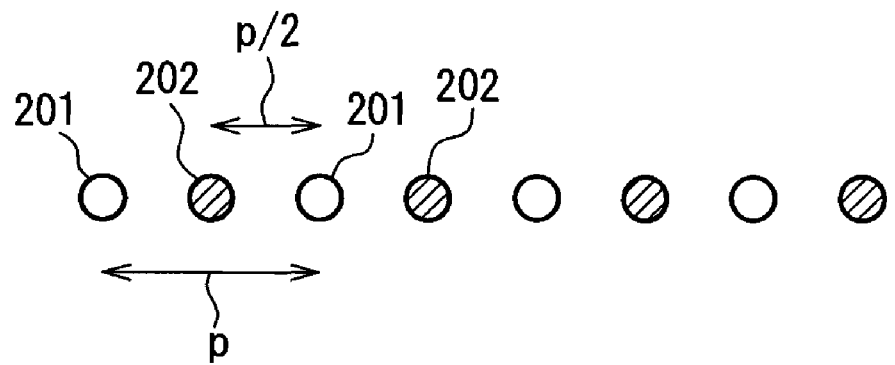
FIG. 14A is a view showing a positional relationship in the horizontal direction between pixels forming two subject images in a synthesized image in the case where the two subject images on two imaging regions are shifted by 0.5 pixels in the horizontal direction in an imaging device according to an embodiment of the present invention.

FIG. 14A shows the positional relationship between the pixels forming the subject image on the imaging region 104b and the pixels forming the subject image on the imaging region 104a on one line in the X-axis direction in a synthesized image obtained by synthesizing the image obtained from the imaging region 104b and the image obtained from the imaging region 104a in the case where the subject image on the imaging region 104b and the subject image on the imaging region 104a are shifted by 0.5 pixels in the X-axis direction and by 0 pixels in the Y-axis direction. Each circle that is white inside represents a pixel 201 forming the subject image on the imaging region 104a and each circle that is hatched inside represents a pixel 202 forming the subject image on the imaging region 104b. The pitch of the pixels 201 in the X-axis direction and the pitch of the pixels 202 in the X-axis direction are both p. The distance between the pixel 201 and the pixel 202 is 0.5 p. Accordingly, an apparent pixel pitch of the synthesized image in the X-axis direction is 0.5 p, and the sampling frequency apparently is doubled, whereby a higher resolution can be achieved in the X-axis direction.

Figure 14B:
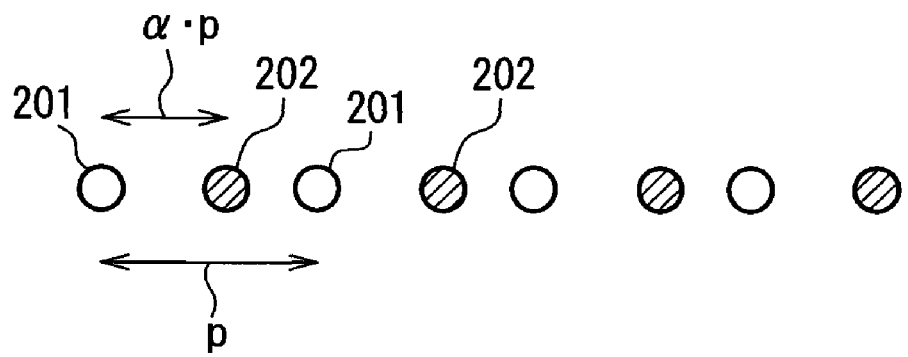
FIG. 14B is a view showing an exemplary positional relationship in the horizontal direction between pixels forming two subject images in a synthesized image in the case where the two subject images on two imaging regions are shifted by α pixels (0.5<α<1) in the horizontal direction in an imaging device according to an embodiment of the present invention.
Figure 14C:
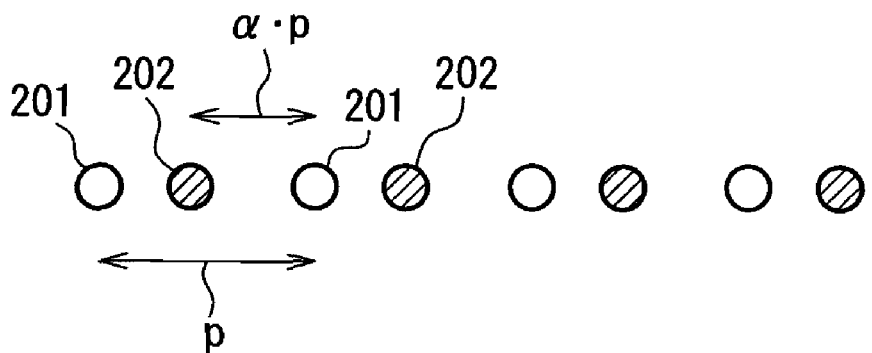
FIG. 14C is a view showing another exemplary positional relationship in the horizontal direction between pixels forming two subject images in a synthesized image in the case where the two subject images on two imaging regions are shifted by α pixels (0.5<α<1) in the horizontal direction in an imaging device according to an embodiment of the present invention.

Next, FIGS. 14B and 14C show the positional relationship between the pixels 202 forming the subject image on the imaging region 104b and the pixels 201 forming the subject image on the imaging region 104a on one line in the X-axis direction in the synthesized image obtained by synthesizing the image obtained from the imaging region 104b and the image obtained from the imaging region 104a in the case where the subject image on the imaging region 104b and the subject image on the imaging region 104a are shifted by $\alpha$ pixels ($0.5<\alpha<1$) in the X-axis direction and by 0 pixels in the Y-axis direction. The pitch of the pixels 201 in the X-axis direction and the pitch of the pixels 202 in the X-axis direction are both p. A longer distance between the pixel 201 and the pixel 202 is $\alpha \cdot p$, and a shorter distance therebetween is $(1-\alpha) \cdot p$. In this case, considering that a longer pixel pitch is apparently $\alpha \cdot p$, when the sampling frequency of an image with a pixel pitch of p is fs, an apparent sampling frequency of the images in FIGS. 14B and 14C is fs/$\alpha$. The present inventors have confirmed by experiment that in order to allow the image whose sampling frequency is fs to have a higher resolution that can be recognized with the unaided eye, the sampling frequency preferably is increased to 4/3·fs or more. Thus, it is necessary that $\alpha$=0.75. Namely, in FIGS. 14B and 14C, it is necessary that the longer distance between the pixel 201 and the pixel 202 is 0.75 p, and the shorter distance therebetween is 0.25 p.

For the reason as described above, in order to obtain a higher-resolution synthesized image, it is preferable that the shifting amount of the position of the subject image between the imaging regions is in a range from 0.25 pixels to 0.75 pixels, which is described as "about 0.5 pixels" in the present invention. Although the above description has been given for achieving a higher resolution in the X-axis direction, the same applies to the Y-axis direction.

At the time of mass production of the imaging device of the present invention, the shifting of the subject image on the imaging region 104c with respect to the subject image on the imaging region 104a by about 0.5 pixels in the Y-axis direction and the shifting of the subject image on the imaging region 104b with respect to the subject image on the imaging region 104a by about 0.5 pixels in the X-axis direction can be achieved by molding the lenses 102a to 102d precisely, or determining the relative positions of the lenses 102a to 102d and the imaging device 103 precisely, for example. Alternatively, the above-described pixel shifting also can be achieved by adjusting the relative rotational positions of the lenses 102a to 102d and the imaging device 103 around an axis parallel with the optical axes 105a to 105d of the lenses.

Figure 15:
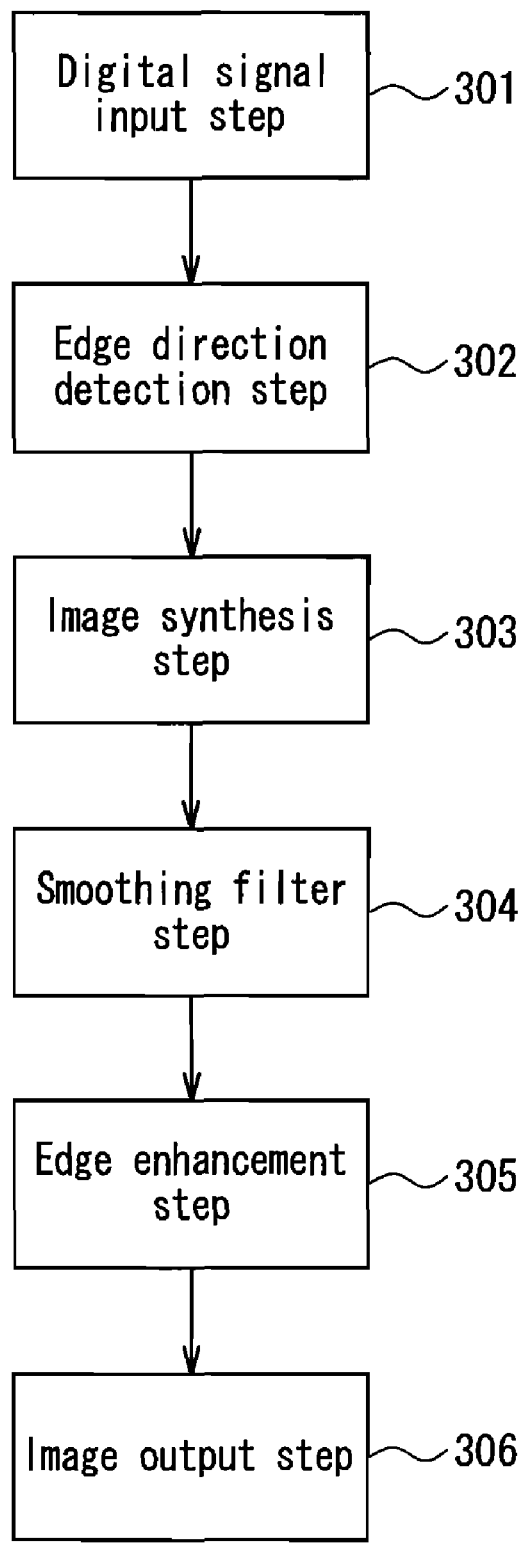
FIG. 15 is a flowchart showing processing performed by an image processing portion of an imaging device according to an embodiment of the present invention.
Figure 16:
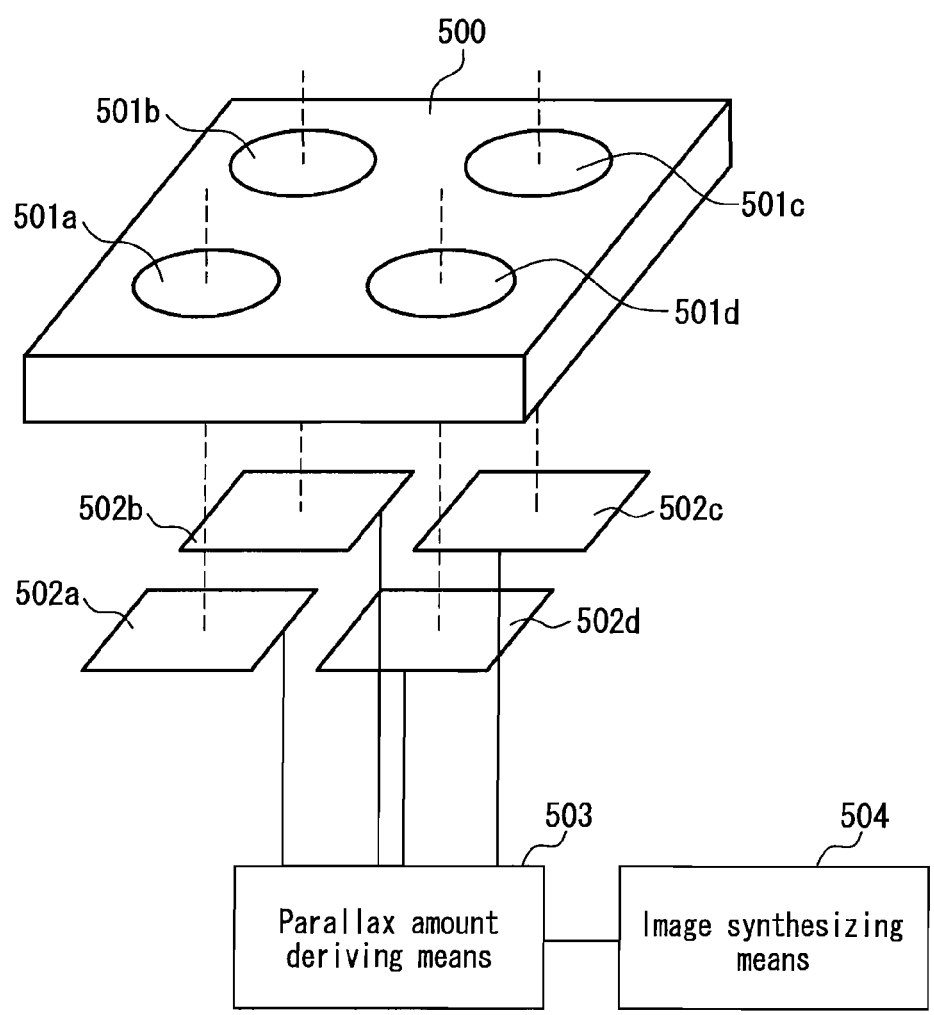
FIG. 16 is a view showing a schematic configuration of a conventional compound-eye imaging device.
Figure 17A:
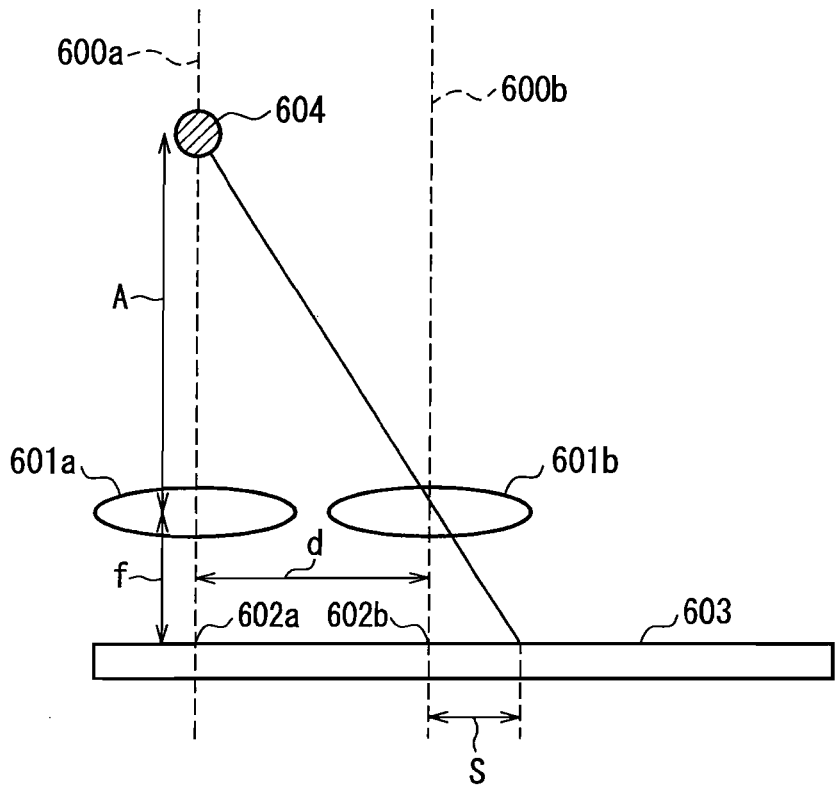
FIG. 17A is a cross-sectional view showing a positional relationship between a plurality of lenses, a subject, and subject images in a compound-eye imaging device.
Figure 17B:
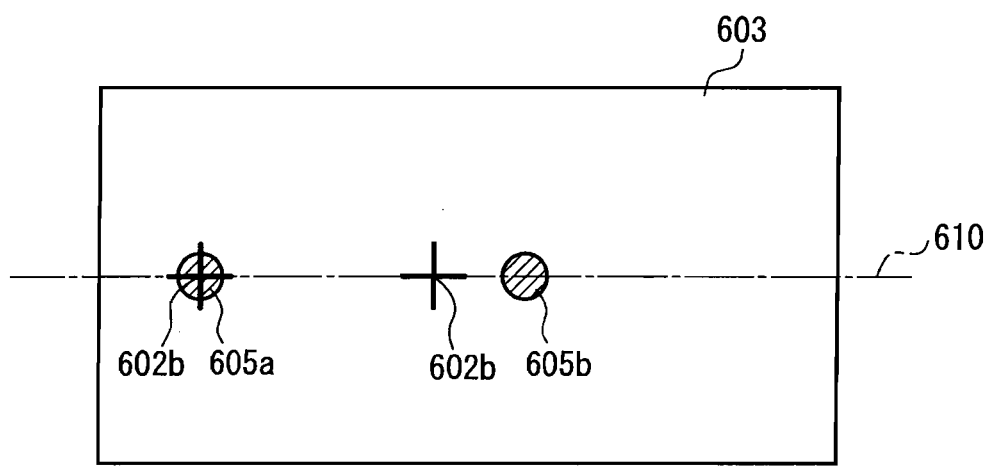
FIG. 17B is a plan view showing positional relationships between optical axes of a plurality of lenses and subject images in a compound-eye imaging device.
Figure 18:
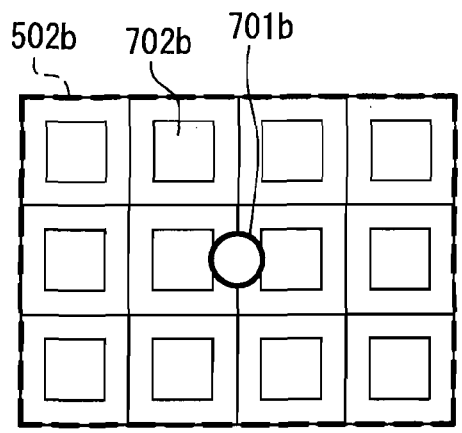
FIG. 18 is a plan view showing relationships between positions of optical axes of a plurality of lenses and a plurality of imaging regions in a conventional compound-eye imaging device.
Figure 18:
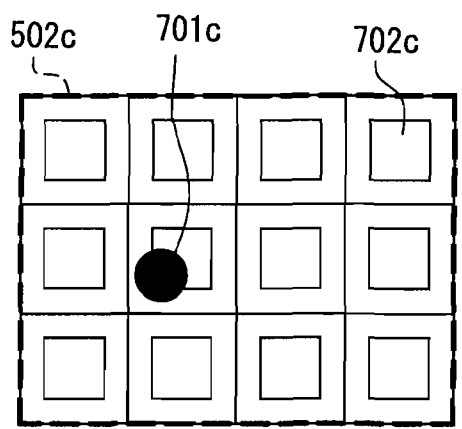
Figure 18:
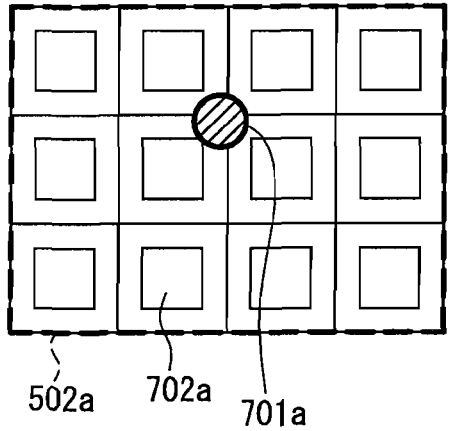
Figure 18:
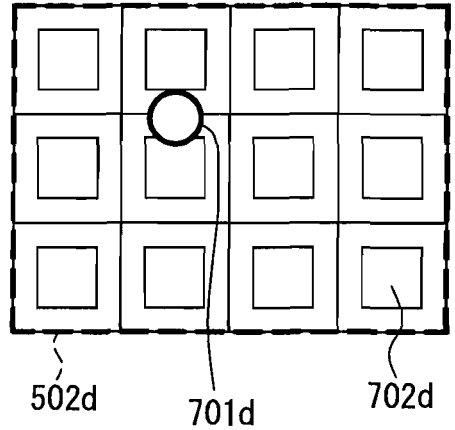
Figure 19A:
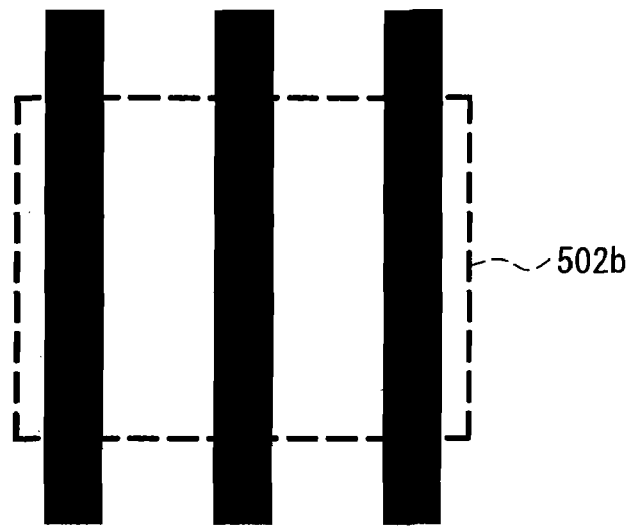
FIG. 19A is a view showing a subject image formed on one imaging region in a conventional compound-eye imaging device.
Figure 19B:
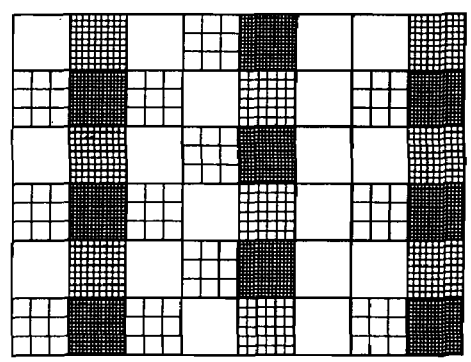
FIG. 19B is a view showing a synthesized image obtained by synthesizing a plurality of images using the pixel shifting technology in the case where a plurality of imaging regions and a plurality of subject images have the positional relationships shown in FIG. 18 in a conventional compound-eye imaging device.
Figure 19C:
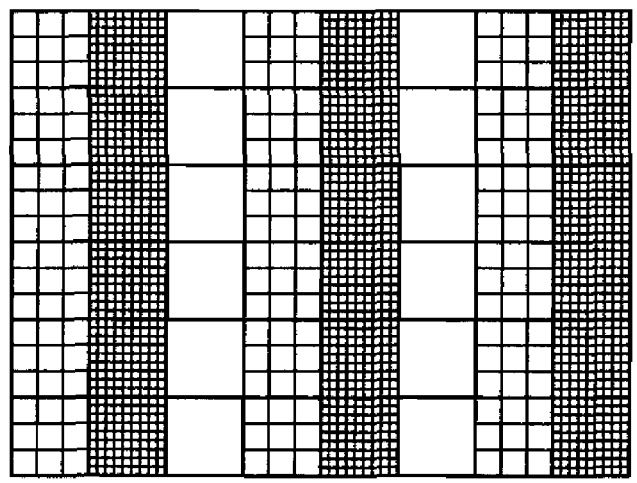
FIG. 19C is a view showing a synthesized image obtained by synthesizing a plurality of images using the pixel shifting technology in the case where a plurality of imaging regions and a plurality of subject images have an ideal positional shifting relationship in a conventional compound-eye imaging device.
Figure 19D:
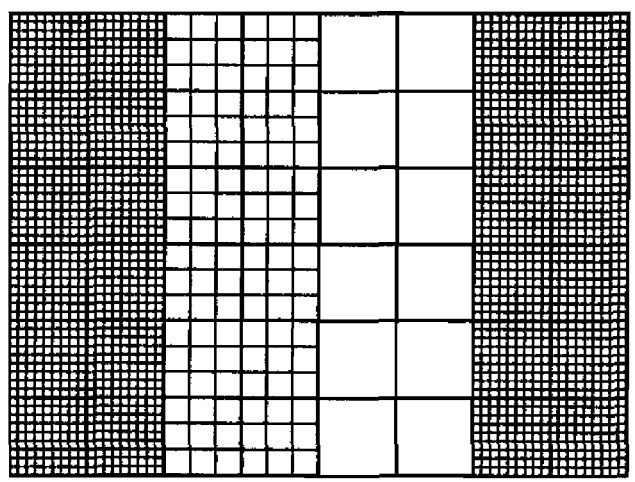
FIG. 19D is a view showing an image captured by one imaging region in a conventional compound-eye imaging device.

The processing of the image processing portion 106 in FIG. 1 is described in a programming language, a HDL (Hardware Description Language), or the like, and its flowchart is shown in FIG. 15. The digital signal from the A/D converter 111 in FIG. 1 is input in digital signal input step 301, the processing similar to that of the edge direction detecting portion 108 in FIG. 1 is performed in edge direction detection step 302, the processing similar to that of the image synthesizing portion 107 in FIG. 1 is performed in image synthesis step 303, the processing similar to that of the smoothing filter portion 109 in FIG. 1 is performed in smoothing filter step 304, the processing similar to that of the edge enhancement portion 110 in FIG. 1 is performed in edge enhancement step 305, and the processed image is output to a monitor, a memory, and the like in image output step 306. The flowchart of the processing is not limited to that in FIG. 15, and any flowchart including similar processing can achieve the effect of the present invention.

The embodiments as described above are exemplary embodiments of the present invention, and do not limit the technical scope of the present invention.

By the above-described embodiments, the present invention can solve the above-described two problems with the following effects.

Firstly, even in the case where the distance between the subject and the imaging device varies from a predetermined fixed value, or the case where the distance between the plurality of lenses varies due to a temperature variation or the like, the amount of pixel shifting does not vary, whereby a high-resolution image always can be obtained regardless of the subject distance or a temperature variation without a physical adjustment using an actuator or the like.

Secondly, even in the case where the shifting amount between the subject images on different imaging regions deviates from an ideal shifting amount of 0.5 pixels due to forming errors or mounting errors of the lens, the subject distance, the temperature, or the like, a high-quality image without noticeable color irregularity can be obtained.

With these first and second effects, it becomes possible to obtain a thin imaging device that always can capture a high-quality image with a large number of pixels regardless of forming errors or mounting errors of the lens, the subject distance, the temperature, or the like.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

INDUSTRIAL APPLICABILITY

Although the imaging device according to the present invention can be utilized in any fields without particular limitation, it is useful in applications such as mobile equipment, a vehicle, a medical application, a monitoring application, and a robot, for example.

The invention claimed is:

1. An imaging device comprising:
a plurality of lenses arranged in the same plane; and
a plurality of imaging regions for respectively receiving a plurality of subject images formed by the plurality of lenses;
wherein vertical line directions and horizontal line directions of a pixel arrangement in the respective plurality of imaging regions are equal to one another among the plurality of imaging regions,
a subject image received by a first imaging region and a subject image received by an imaging region having a parallax in the vertical line direction with respect to the first imaging region among the plurality of imaging regions are shifted from each other by a predetermined amount in the horizontal line direction,
the subject image received by the first imaging region and a subject image received by an imaging region having a parallax in the horizontal line direction with respect to the first imaging region are shifted from each other by a predetermined amount in the vertical line direction,
a shifting amount Gsx in the horizontal line direction between an optical axis of a lens corresponding to the first imaging region and an optical axis of a lens corresponding to the imaging region having a parallax in the vertical line direction with respect to the first imaging region satisfies $|Gsx| \leq A1 \cdot p/(4 \cdot f)$, where A1 indicates a lower limit of a subject distance, f indicates a distance between the lenses and the imaging regions, and p indicates a pixel pitch of the imaging regions, and
a shifting amount Gsy in the vertical line direction between an optical axis of the lens corresponding to the first imaging region and an optical axis of a lens corresponding to the imaging region having a parallax in the horizontal line direction with respect to the first imaging region satisfies $|Gsy| \leq A1 \cdot p/(4 \cdot f)$, where A1 indicates the lower limit of the subject distance, f indicates the distance between the lenses and the imaging regions, and p indicates the pixel pitch of the imaging regions.

2. The imaging device according to claim 1, wherein the predetermined amount is in a range from 0.25 to 0.75 times a pixel pitch in the plurality of imaging regions in the direction of shifting by the predetermined amount.

3. The imaging device according to claim 1, wherein a plurality of color filters are provided between the plurality of lenses and the plurality of imaging regions.

4. The imaging device according to claim 3, wherein at least two of the plurality of color filters have the same spectral transmittance characteristics.

5. The imaging device according to claim 1,
wherein a relative positional relationship between the first imaging region and an optical axis of a lens corresponding to the first imaging region is shifted in the horizontal line direction with respect to a relative positional relationship between the imaging region having a parallax in the vertical line direction with respect to the first imaging region and an optical axis of a lens corresponding to the imaging region by an amount in a range from 0.25 to 0.75 times a pixel pitch in the plurality of imaging regions in the horizontal line direction, and
the relative positional relationship between the first imaging region and the optical axis of the lens corresponding to the first imaging region is shifted in the vertical line direction with respect to a relative positional relationship between the imaging region having a parallax in the horizontal line direction with respect to the first imaging region and an optical axis of a lens corresponding to the imaging region by an amount in a range from 0.25 to 0.75 times a pixel pitch in the plurality of imaging regions in the vertical line direction.

6. An imaging device comprising
a plurality of lenses arranged in the same plane; and
a plurality of imaging regions for respectively receiving a plurality of subject images formed by the plurality of lenses;
wherein vertical line directions and horizontal line directions of a pixel arrangement in the respective plurality of imaging regions are equal to one another among the plurality of imaging regions,
a subject image received by a first imaging region and a subject image received by an imaging region having a parallax in the vertical line direction with respect to the first imaging region among the plurality of imaging regions are shifted from each other by a predetermined amount in the horizontal line direction, and
the subject image received by the first imaging region and a subject image received by an imaging region having a parallax in the horizontal line direction with respect to the first imaging region are shifted from each other by a predetermined amount in the vertical line direction,
the imaging device further comprising an image processor for processing a plurality of image data output respectively from the plurality of imaging regions;
wherein the image processor includes an image synthesizer for synthesizing the plurality of image data to produce and output synthesized image data having a resolution higher than resolutions of the plurality of image data,
the image synthesizer includes an edge direction detector for detecting a direction of an edge in a local region included in at least one of the plurality of image data, and
the image synthesizer changes a method for synthesizing the plurality of image data based on the direction of the edge determined by the edge direction detector.

7. The imaging device according to claim 6, wherein when the edge direction detector determines that the edge direction in the local region is the same as the vertical line direction, the image synthesizer arranges the same pixel signal values continuously in a vertical direction in the local region of the synthesized image data.

8. The imaging device according to claim 6, wherein when the edge direction detector determines that the edge direction in the local region is the same as the vertical line direction, the image synthesizer arranges in the horizontal line direction pixel signal values of at least two of the plurality of image data that are shifted from each other in the horizontal line direction, and arranges between two adjacent pixels in the vertical line direction an interpolated value of pixel signal values of the two pixels in the local region of the synthesized image data.

9. The imaging device according to claim 6, wherein when the edge direction detector determines that the edge direction in the local region is the same as the horizontal line direction, the image synthesizer arranges the same pixel signal values continuously in a horizontal direction in the local region of the synthesized image data.

10. The imaging device according to claim 6, wherein when the edge direction detector determines that the edge direction in the local region is the same as the horizontal line direction, the image synthesizer arranges in the vertical line direction pixel signal values of at least two of the plurality of image data that are shifted from each other in the vertical line direction, and arranges between two adjacent pixels in the horizontal line direction an interpolated value of pixel signal values of the two pixels in the local region of the synthesized image data.

11. The imaging device according to claim 6, wherein when the edge direction detector determines that the edge direction in the local region extends obliquely with respect to the vertical line direction, the image synthesizer arranges the same pixel signal values continuously in the edge direction in the local region of the synthesized image data.

12. The imaging device according to claim 6, wherein when the edge direction detector determines that the edge direction in the local region extends obliquely with respect to the vertical line direction, the image synthesizer arranges pixel signal values of at least two of the plurality of image data that are shifted from each other in the horizontal line direction or the vertical line direction and an interpolated value of pixel signal values of two adjacent pixels in the edge direction in the local region of the synthesized image data.

13. The imaging device according to claim 6, further comprising an image processor for processing a plurality of image data output respectively from the plurality of imaging regions;
    wherein the image processor includes an image synthesizer for synthesizing the plurality of image data to produce and output synthesized image data having a resolution higher than resolutions of the plurality of image data, and
    the image synthesizer selects a plurality of image data to be used for synthesis from the plurality of image data in accordance with the shifting amounts of the plurality of imaging regions.

14. The imaging device according to claim 13, wherein the image synthesizer selects image data whose shifting amounts are closest to a predetermined value from the plurality of image data.

15. The imaging device according to claim 13, wherein the image synthesizer selects image data whose shifting amounts are within a predetermined range from the plurality of image data.

16. The imaging device according to claim 15, wherein the predetermined range is a range from 0.25 to 0.75 times a pixel pitch in the plurality of imaging regions in the direction of shifting by the predetermined amount.

17. The imaging device according to claim 1, further comprising an image processor for processing a plurality of image data output respectively from the plurality of imaging regions;
    wherein the image processor includes: an image synthesizer for synthesizing the plurality of image data to produce and output synthesized image data having a resolution higher than resolutions of the plurality of image data;
    a smoothing filter for outputting smoothed image data obtained by smoothing a pixel signal value of each pixel of the synthesized image data or image data obtained by processing the synthesized image data, based on a pixel signal value of a pixel in a vicinity of the each pixel; and
    an edge enhancement filter for outputting edge-enhanced image data obtained by subjecting a pixel signal value of each pixel of the smoothed image data or image data obtained by processing the smoothed image data to edge enhancement based on a pixel signal value in a vicinity of the each pixel.

\* \* \* \* \*